April 3, 1956
B. C. COONS
2,740,441
PEAR FEEDING, PEELING, HALVING, SEED CELLING, AND TRIMMING MACHINE
Filed March 12, 1951
21 Sheets-Sheet 1
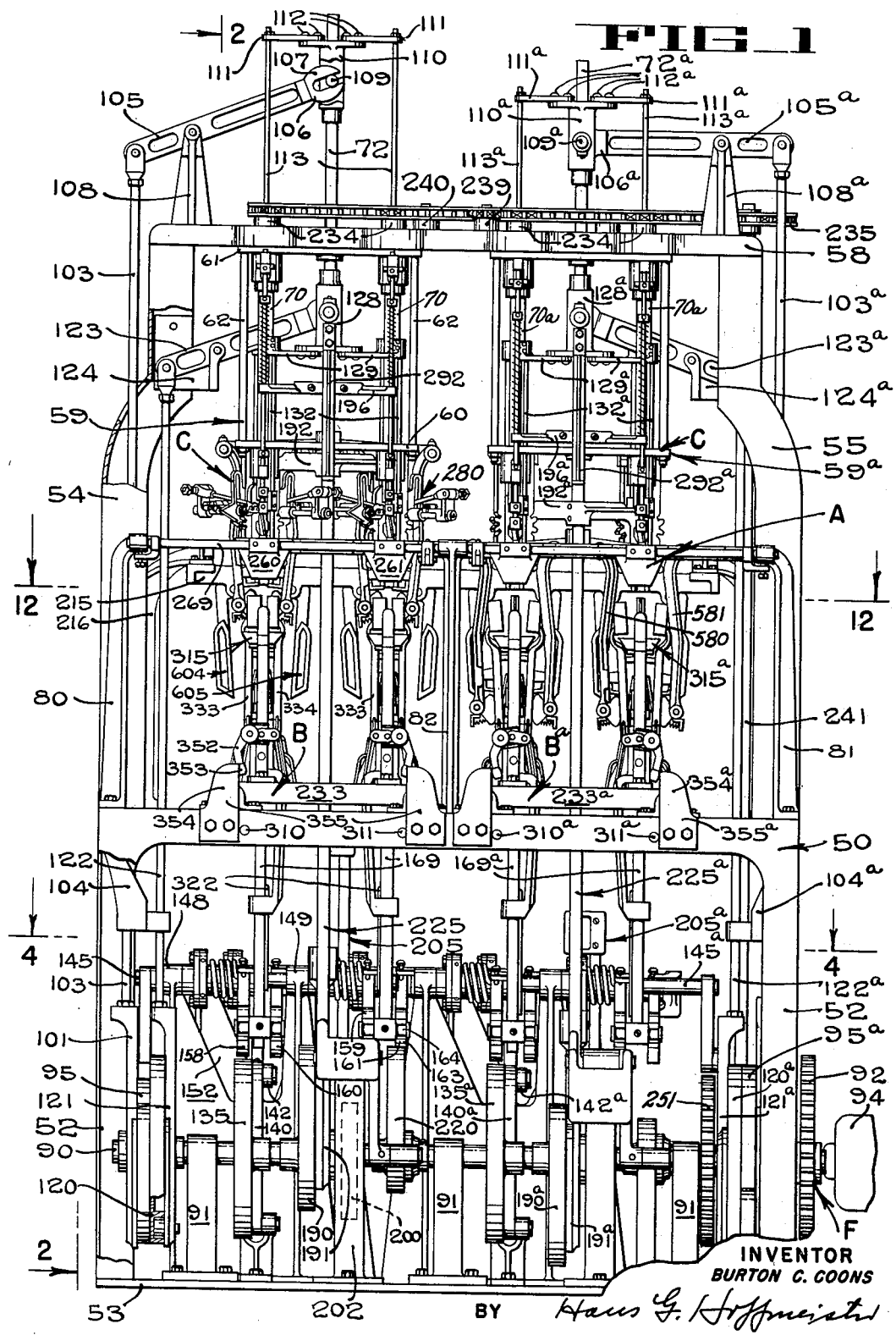
FIG_1
INVENTOR
BURTON C. COONS
BY Hans G. Hoffmeister
ATTORNEY

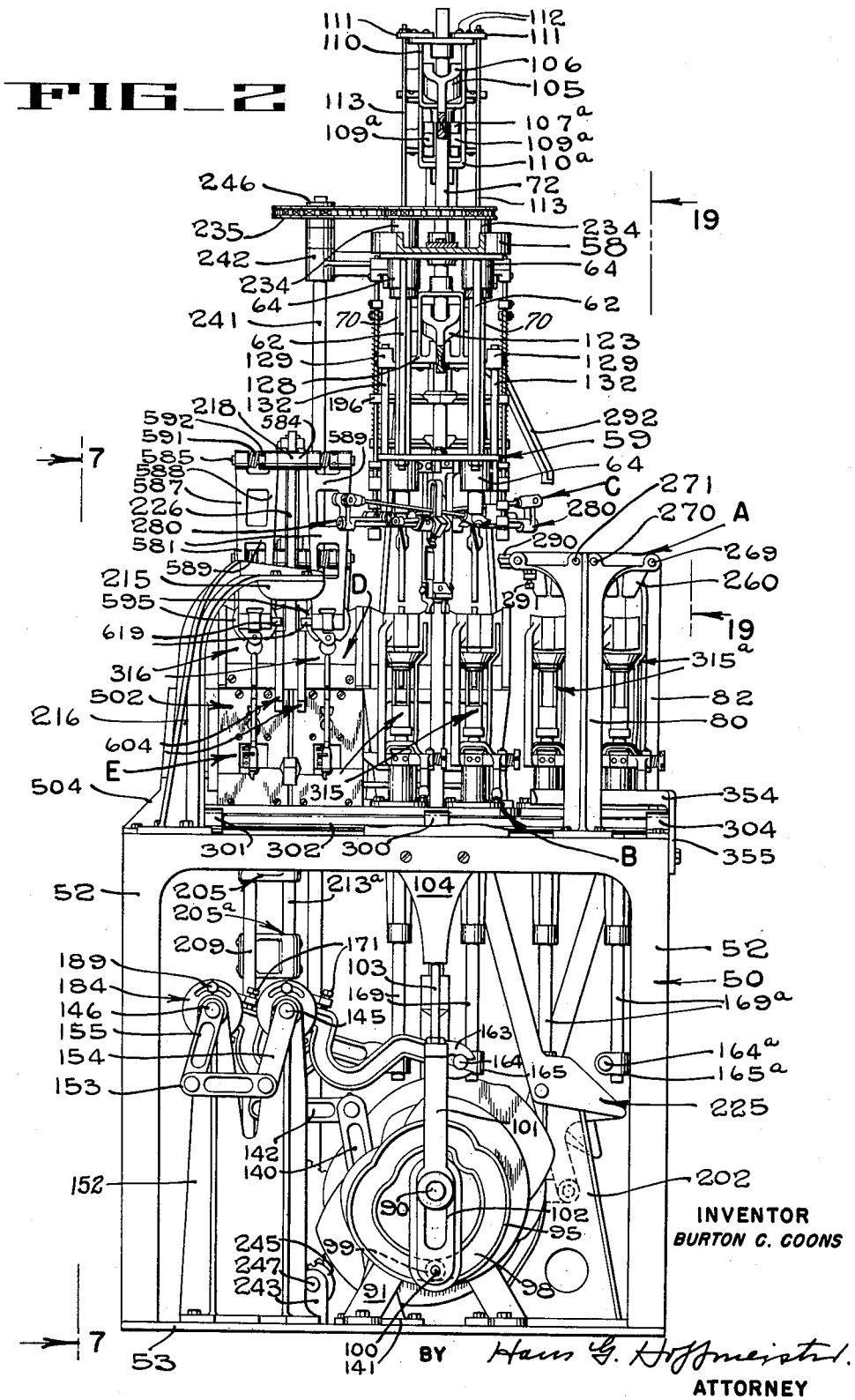

April 3, 1956 B. C. COONS 2,740,441
PEAR FEEDING, PEELING, HALVING, SEED CELLING, AND TRIMMING MACHINE
Filed March 12, 1951 21 Sheets-Sheet 3
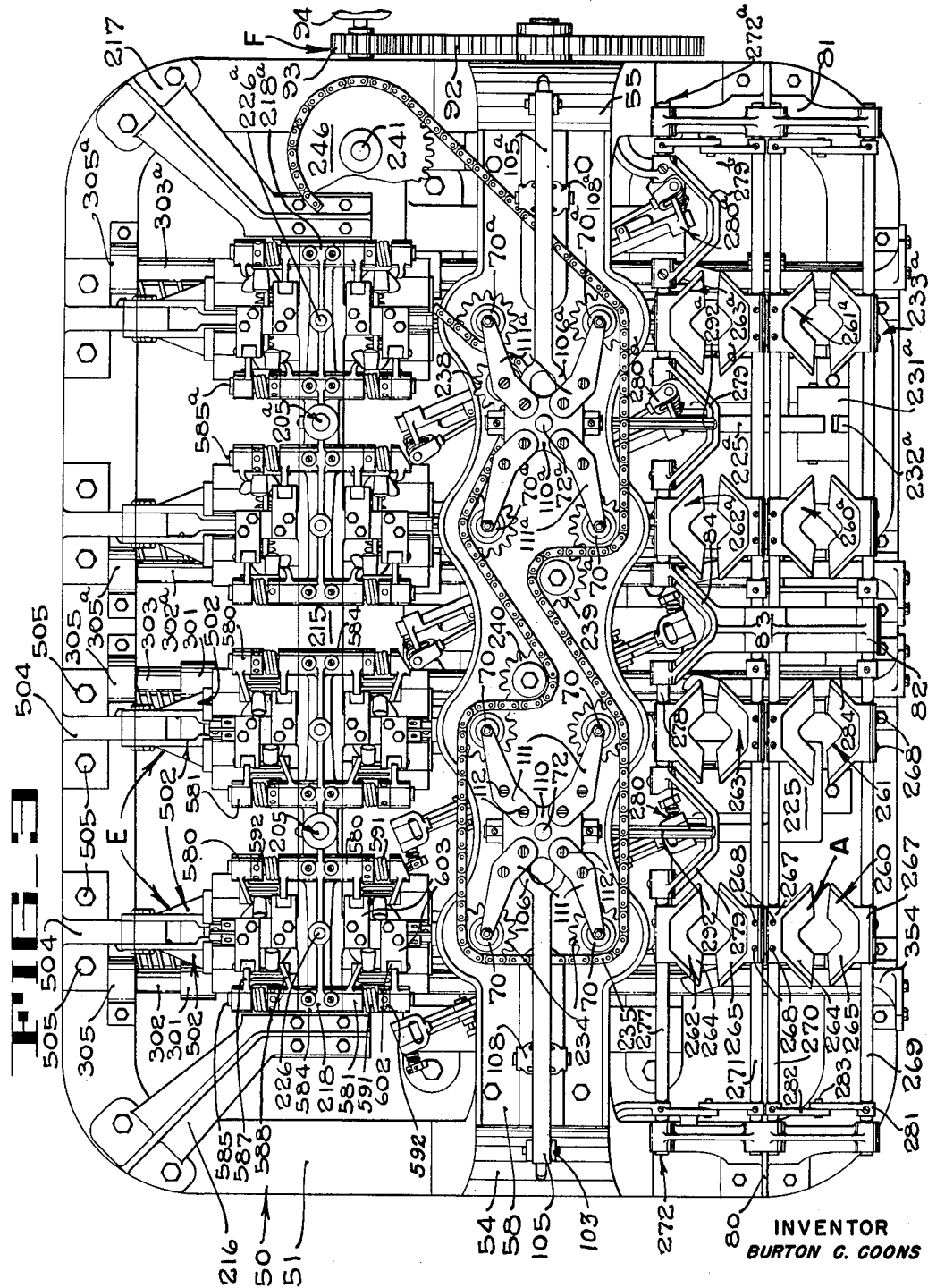
INVENTOR
BURTON C. COONS
BY
*Hans G. Hoffmeister*
ATTORNEY

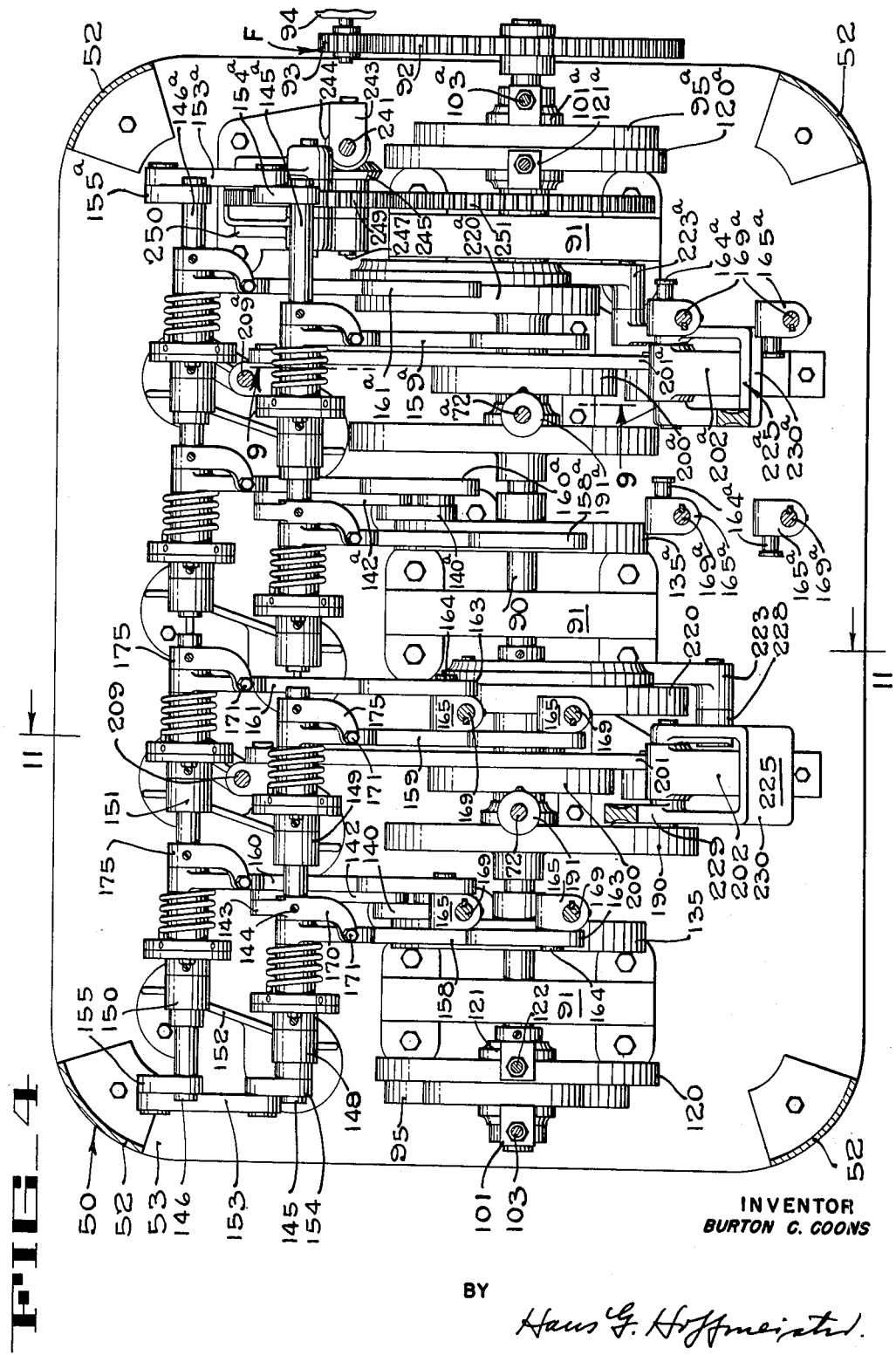

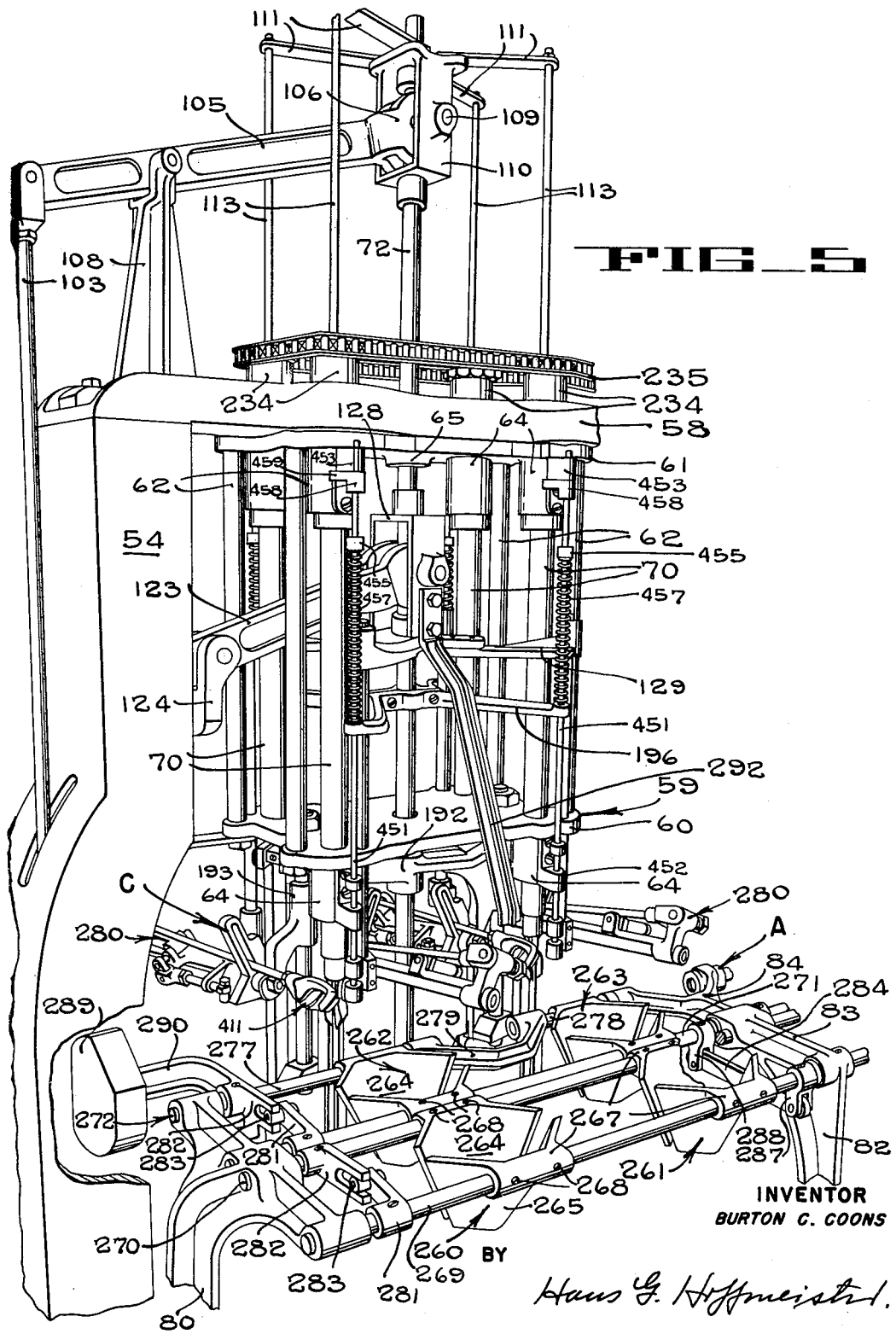

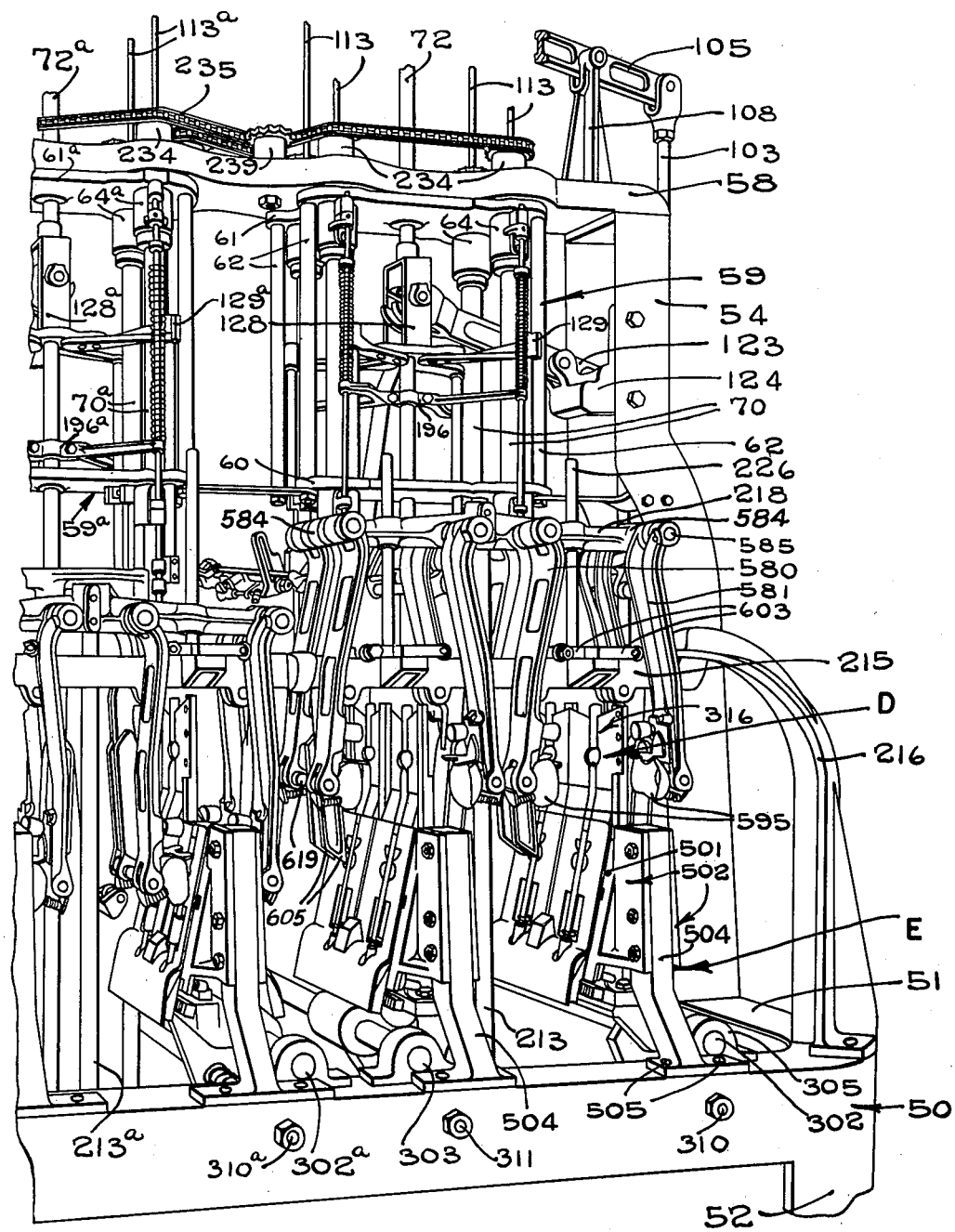
FIG_6

April 3, 1956 B. C. COONS 2,740,441
PEAR FEEDING, PEELING, HALVING, SEED CELLING, AND TRIMMING MACHINE
Filed March 12, 1951 21 Sheets-Sheet 7
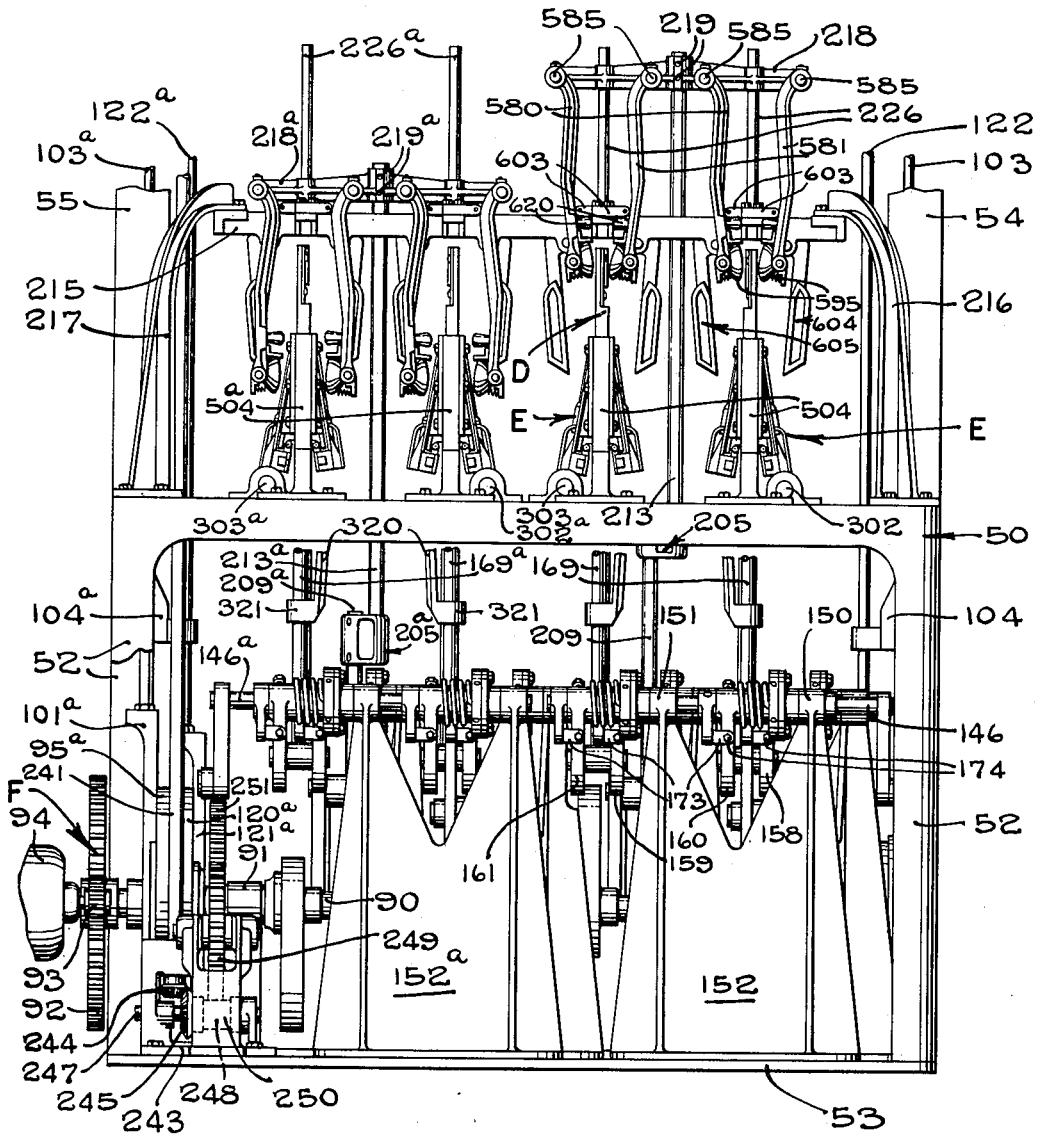
FIG_7
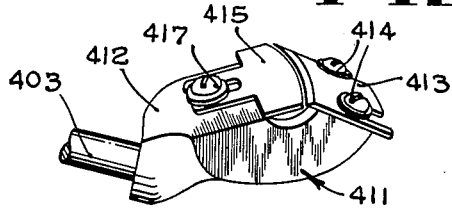
FIG_8
INVENTOR
BURTON C. COONS
BY
Hans G. Hoffmeister
ATTORNEY

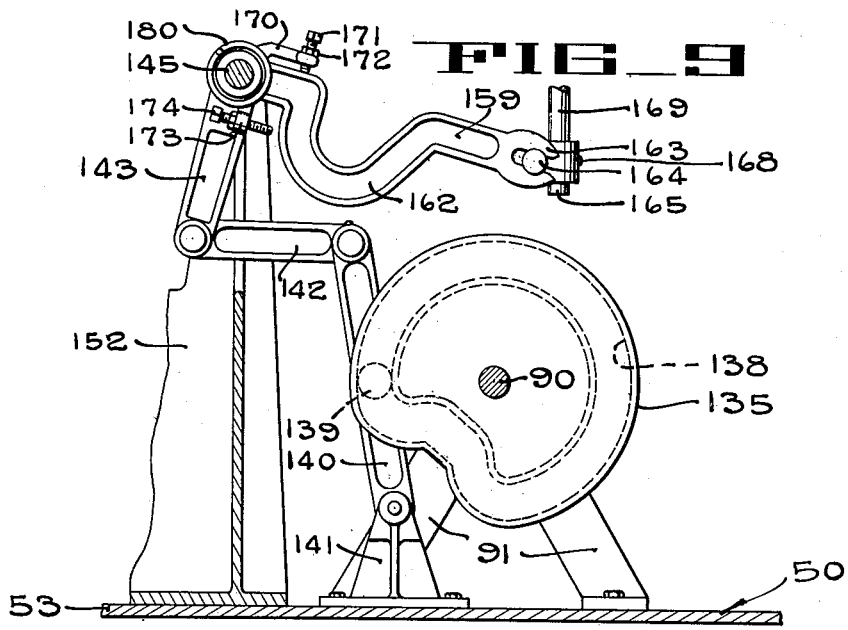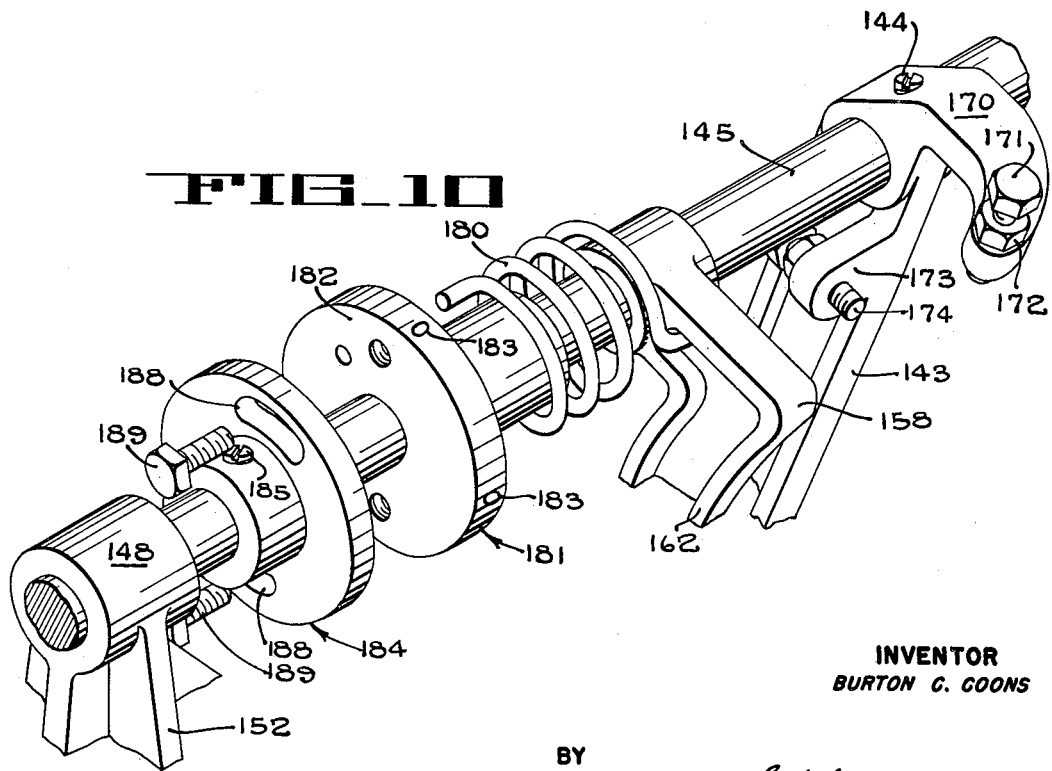

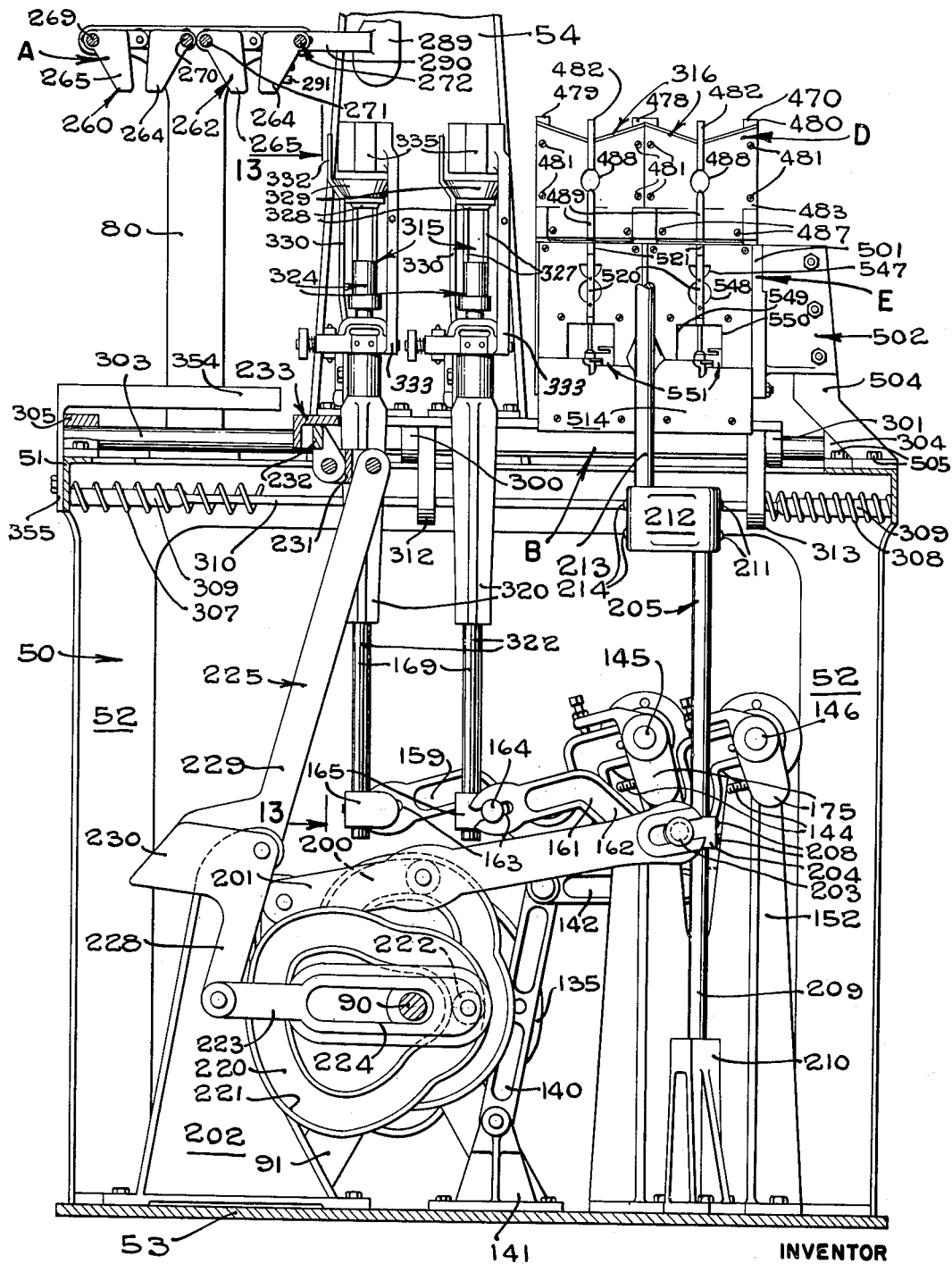
FIG_11

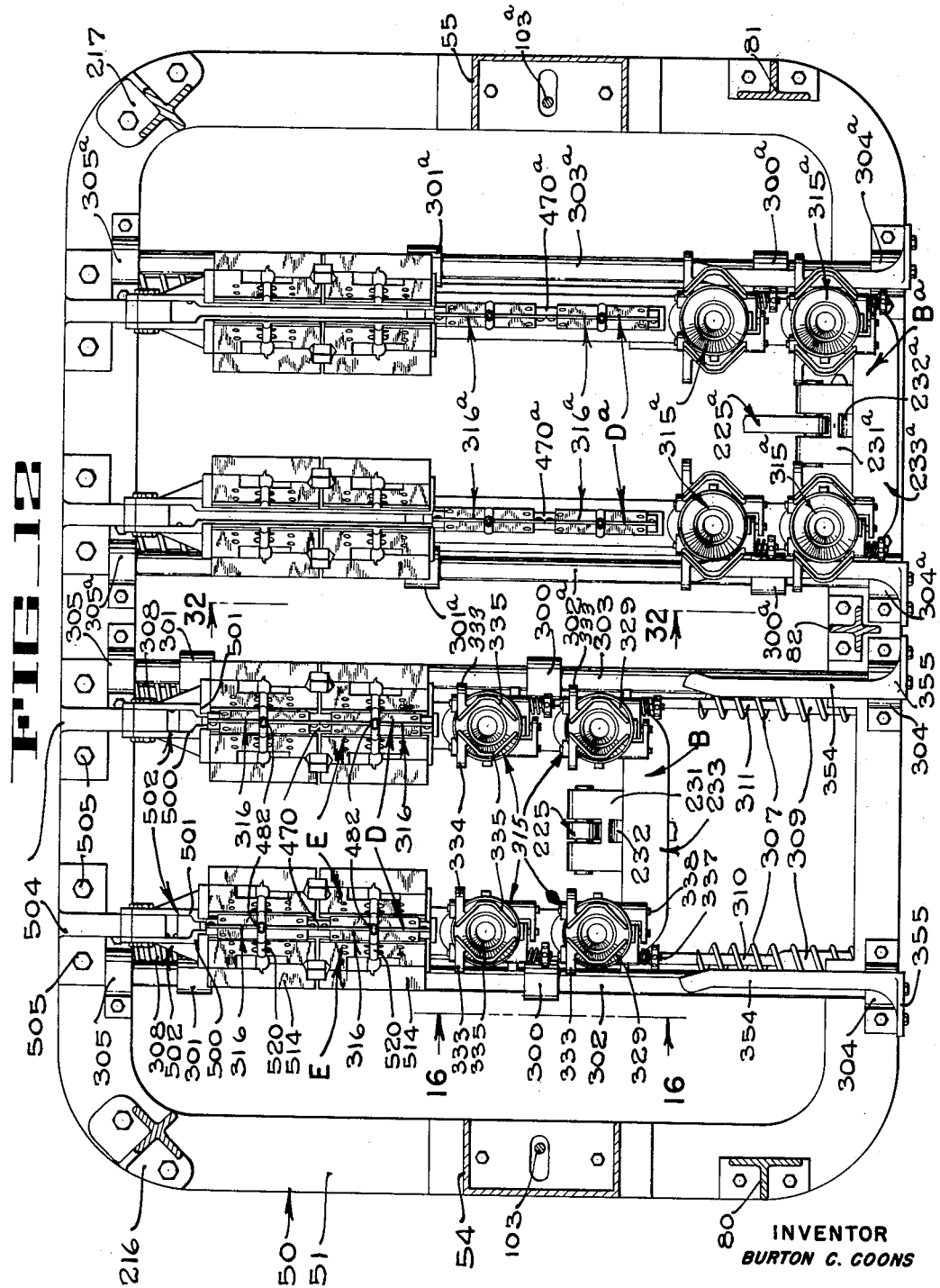

April 3, 1956 B. C. COONS 2,740,441
PEAR FEEDING, PEELING, HALVING, SEED CELLING, AND TRIMMING MACHINE
Filed March 12, 1951 21 Sheets-Sheet 11
FIG_13
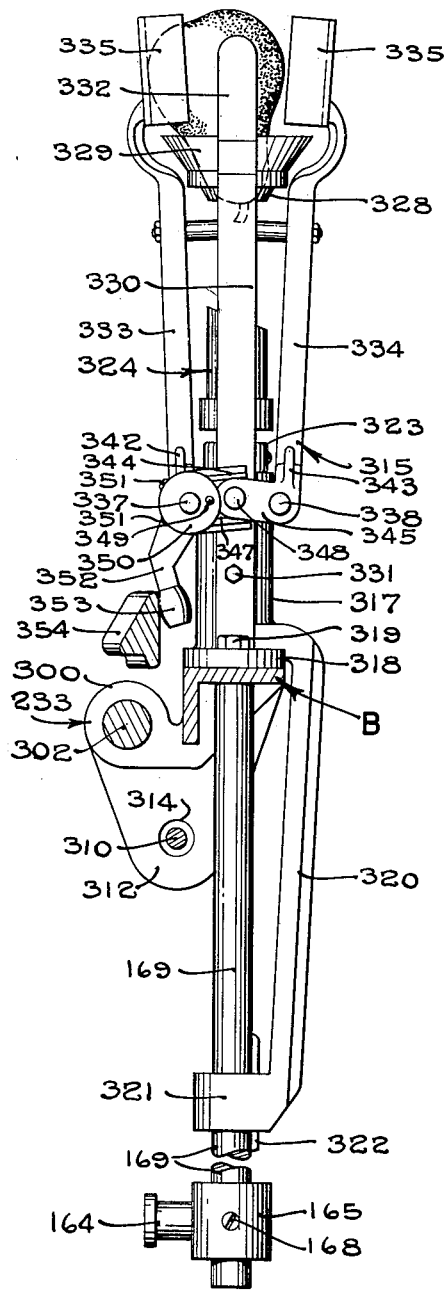
FIG_15
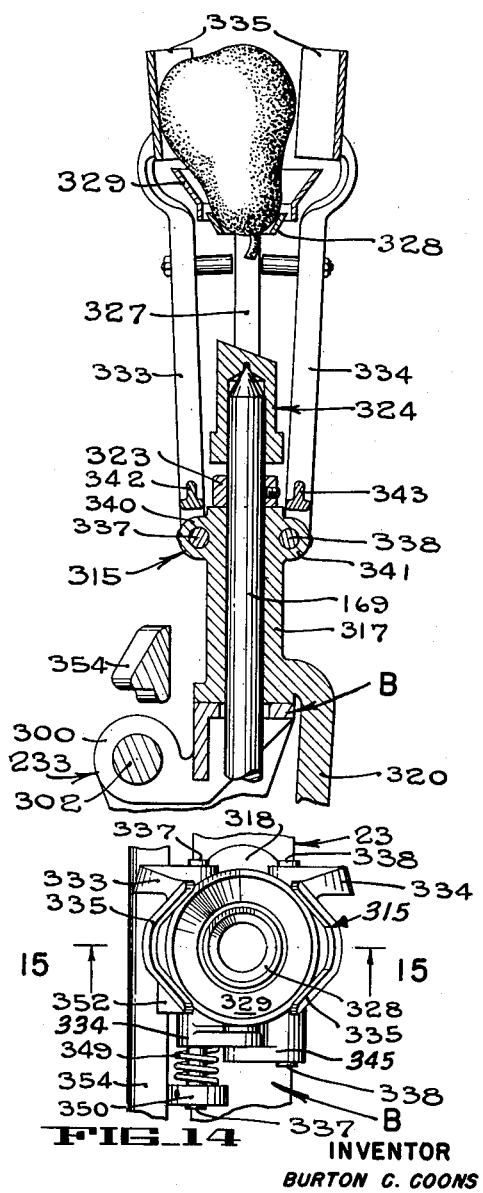
FIG_14
INVENTOR
BURTON C. COONS
BY
Hans G. Hoffmeister
ATTORNEY

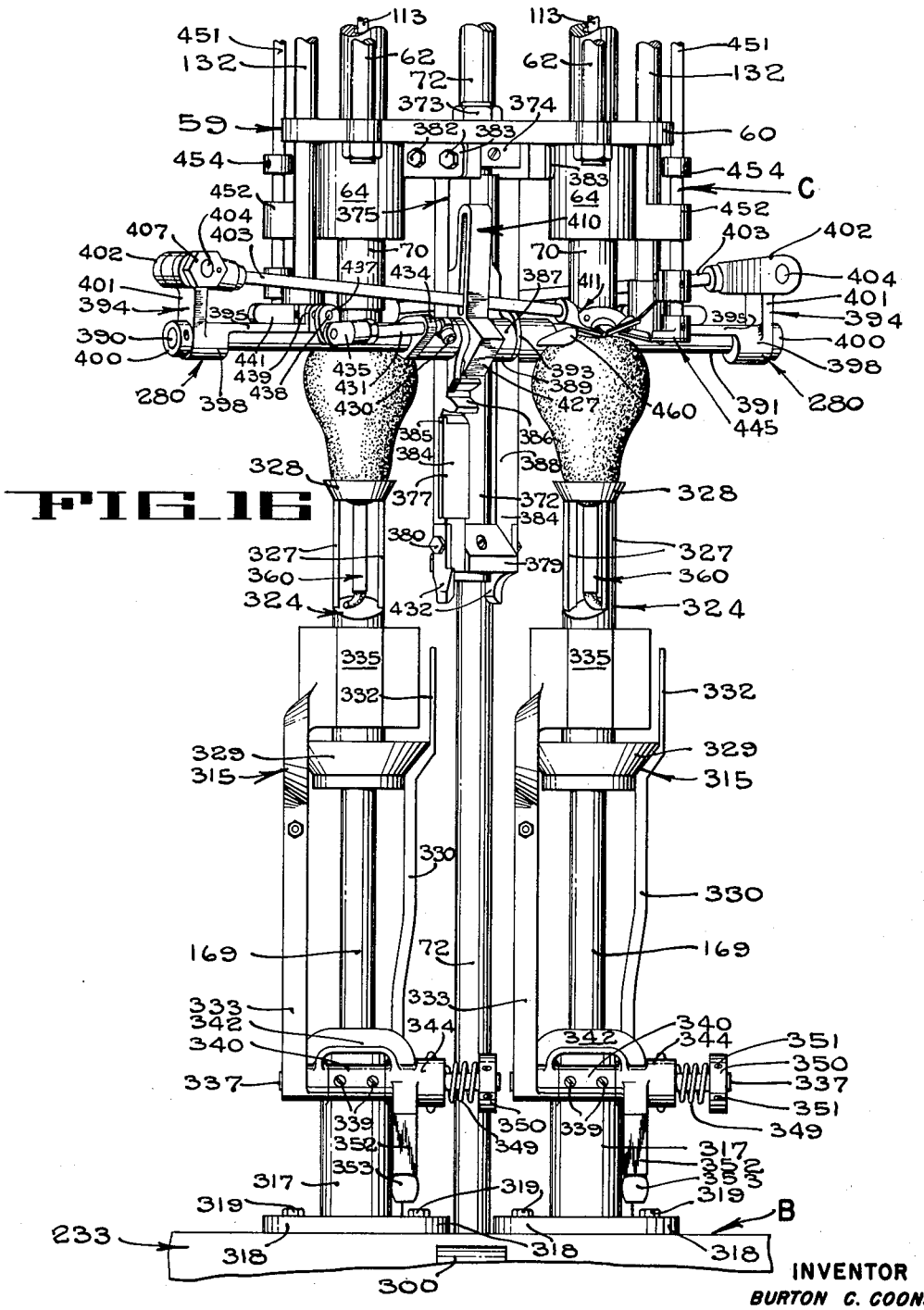

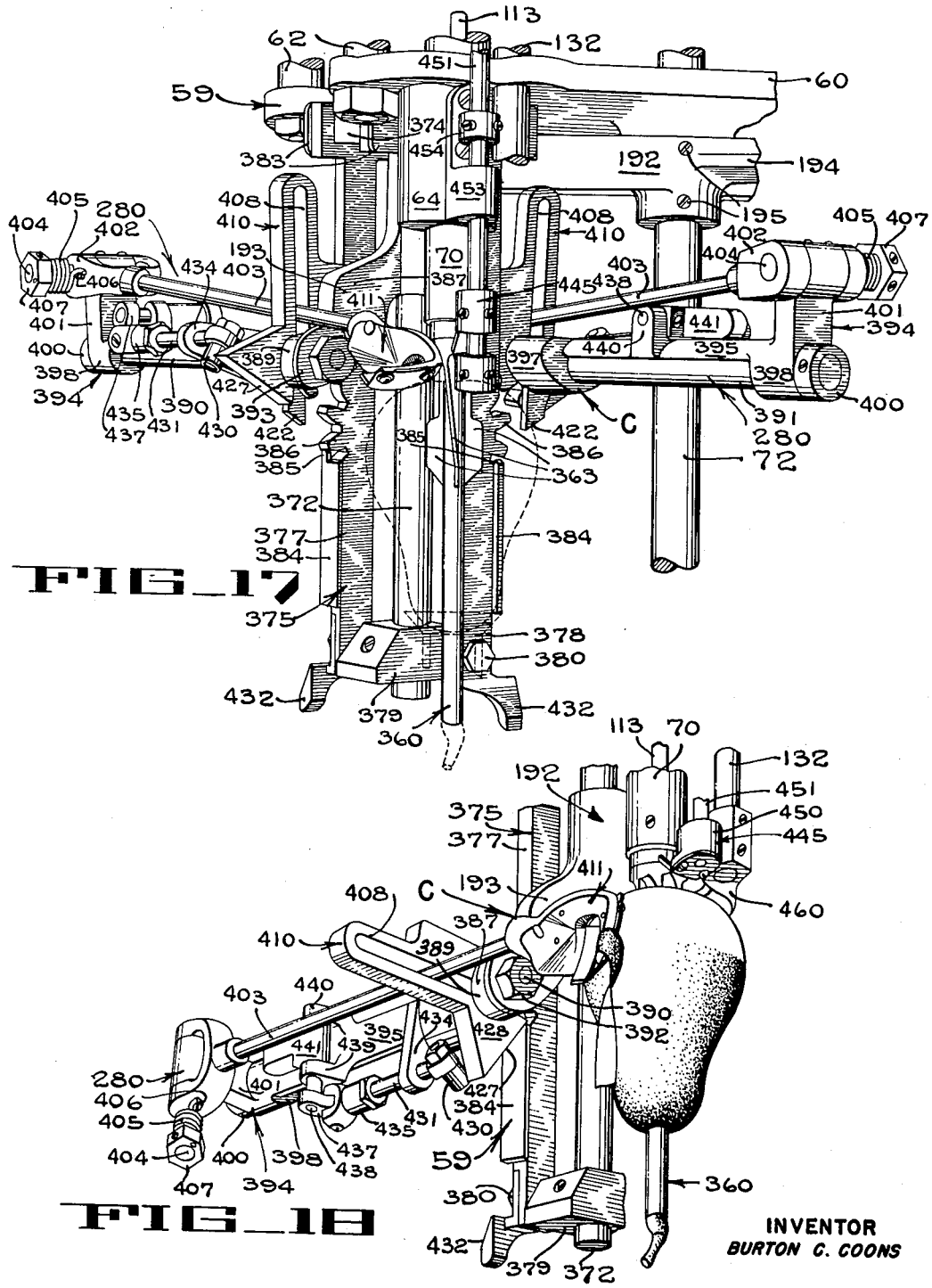

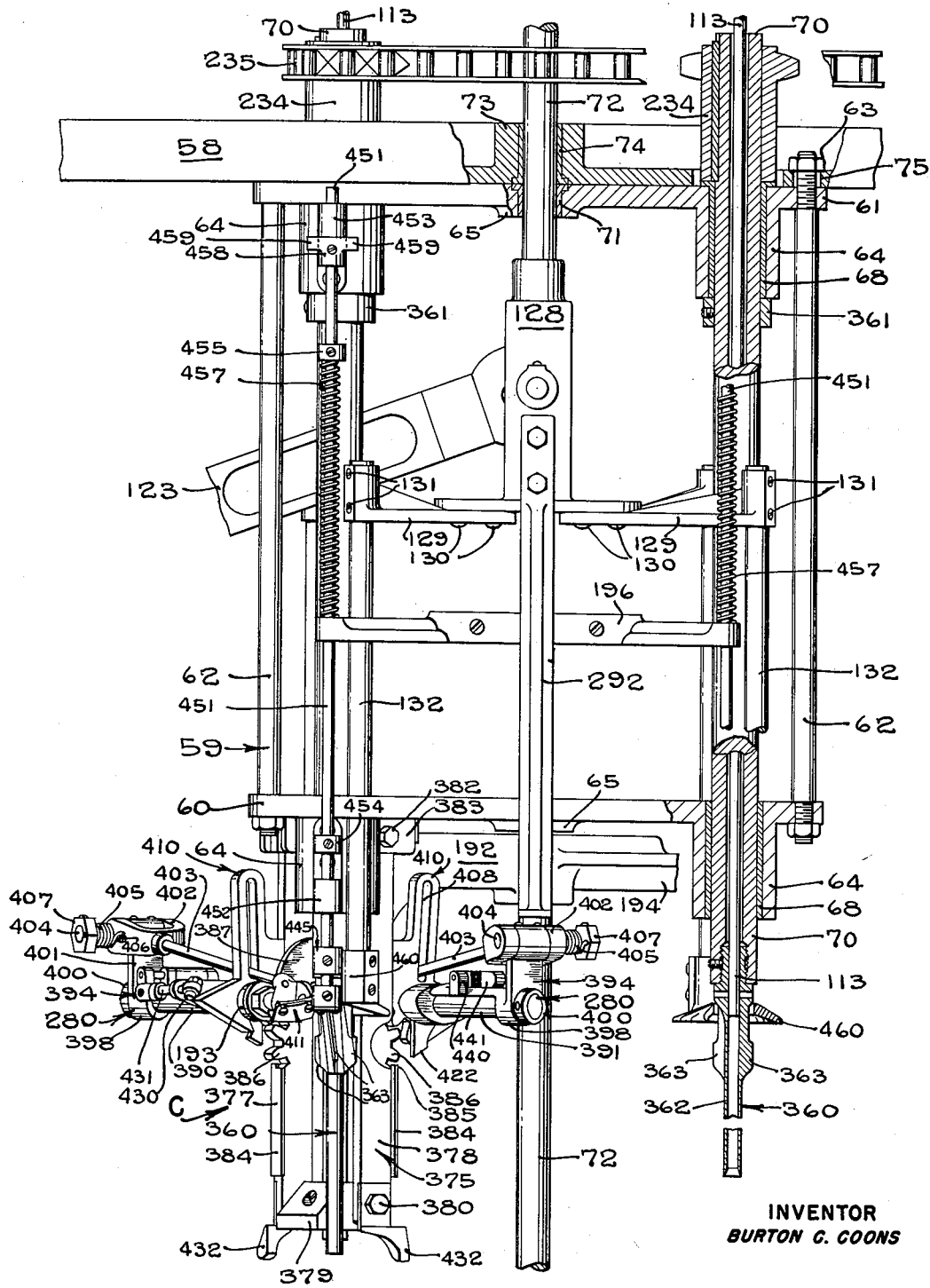
FIG_19

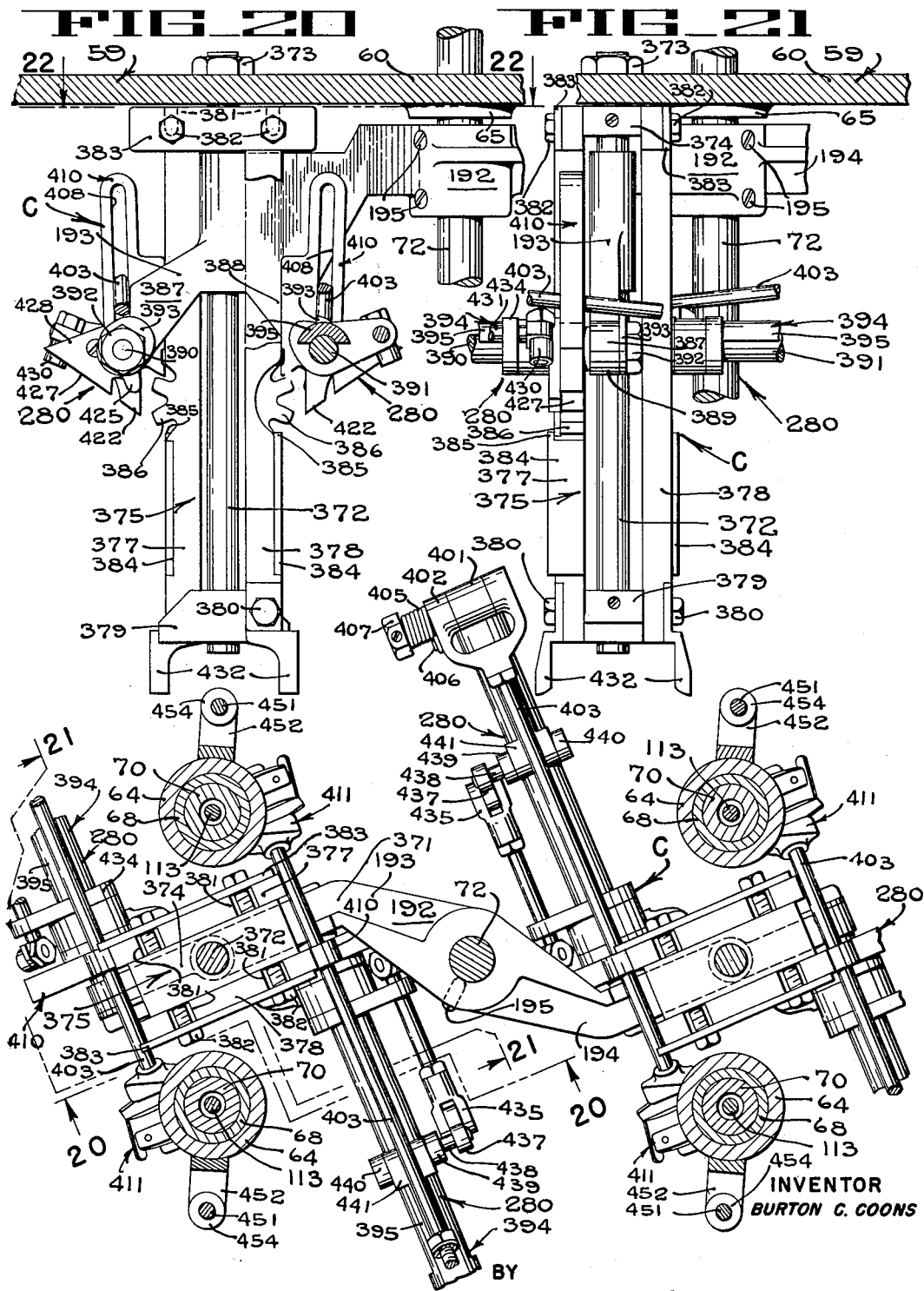

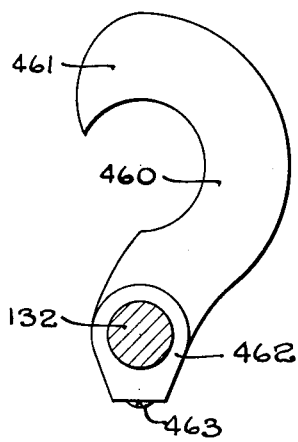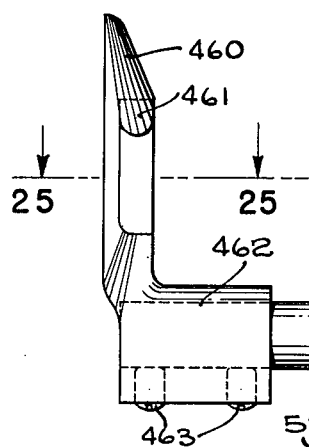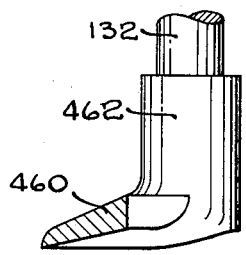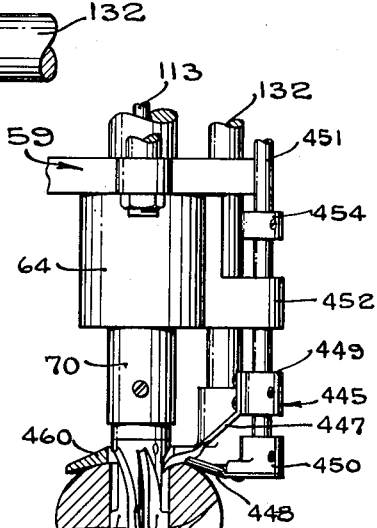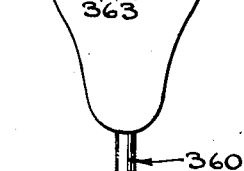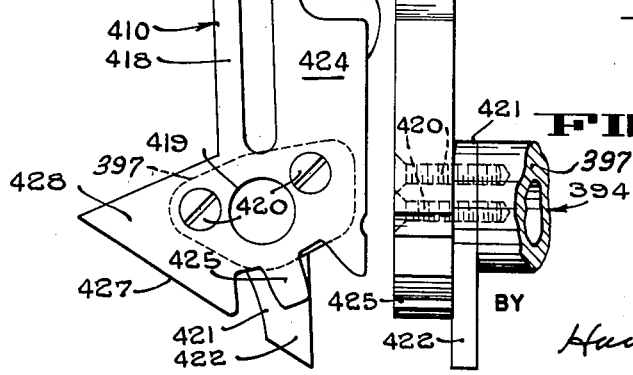

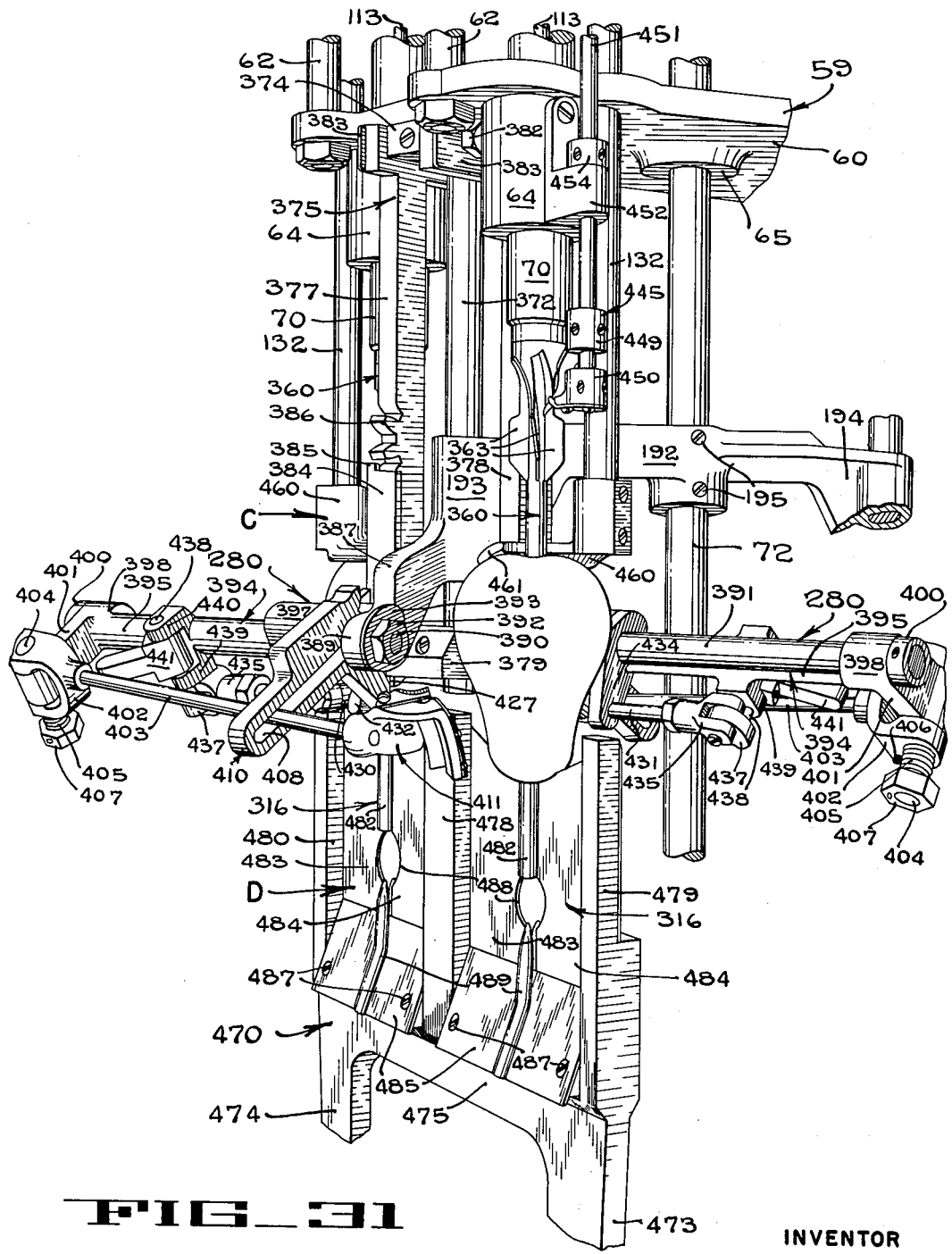

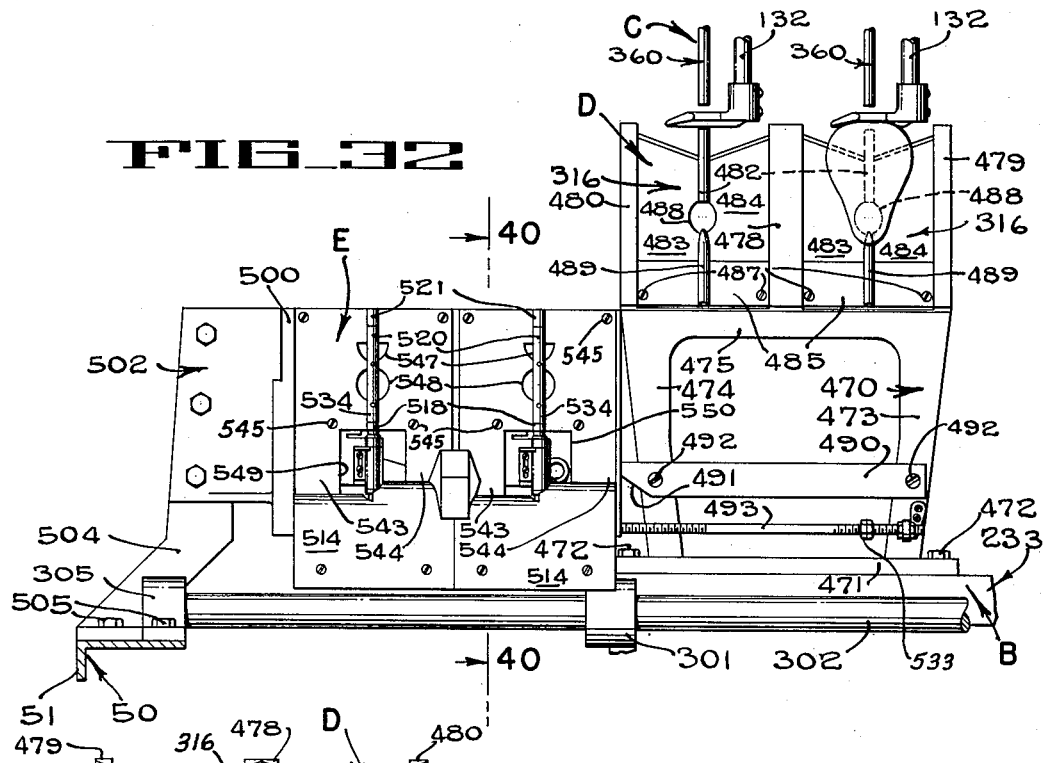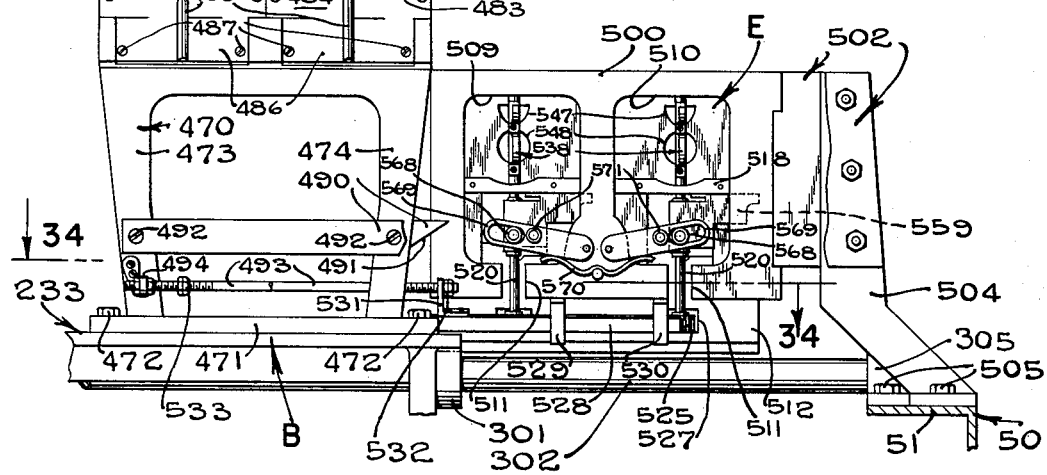

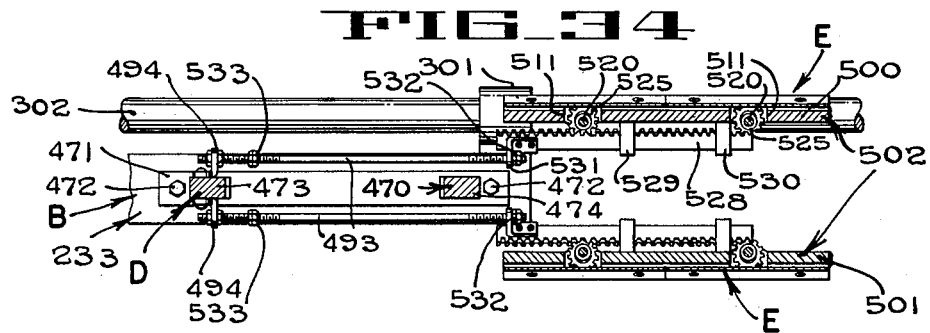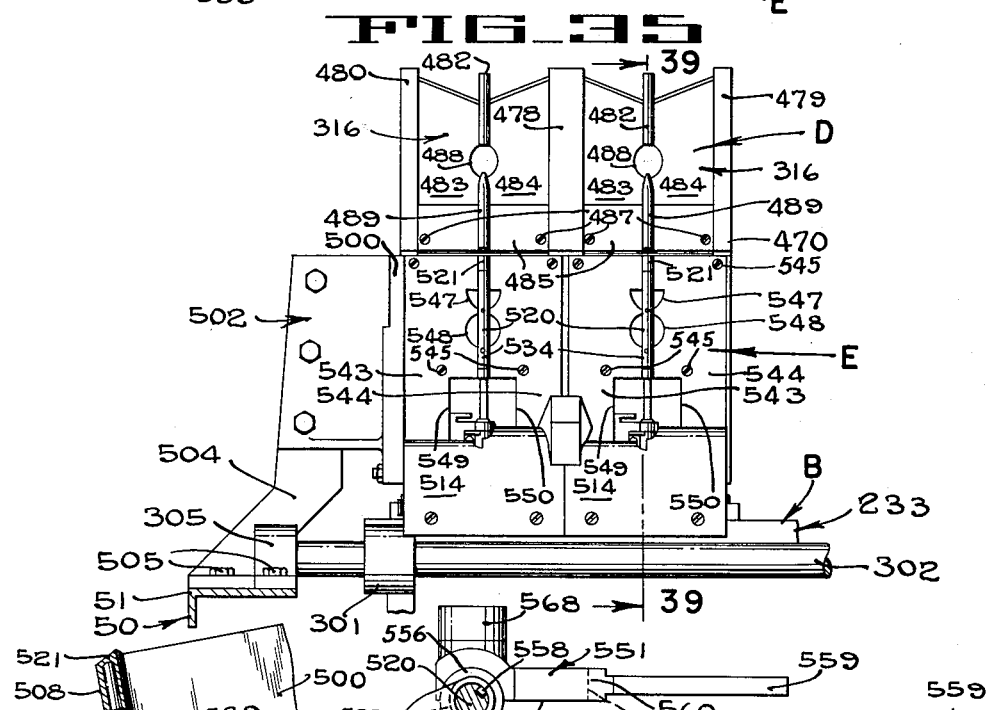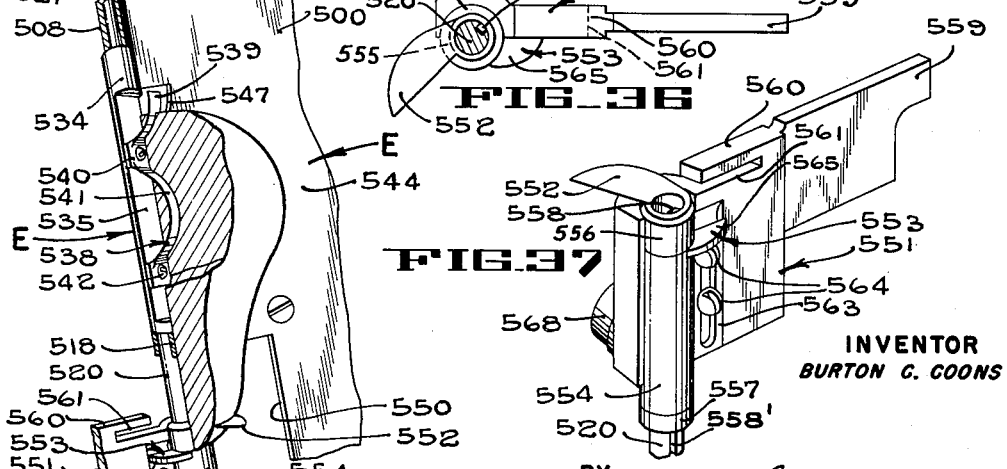

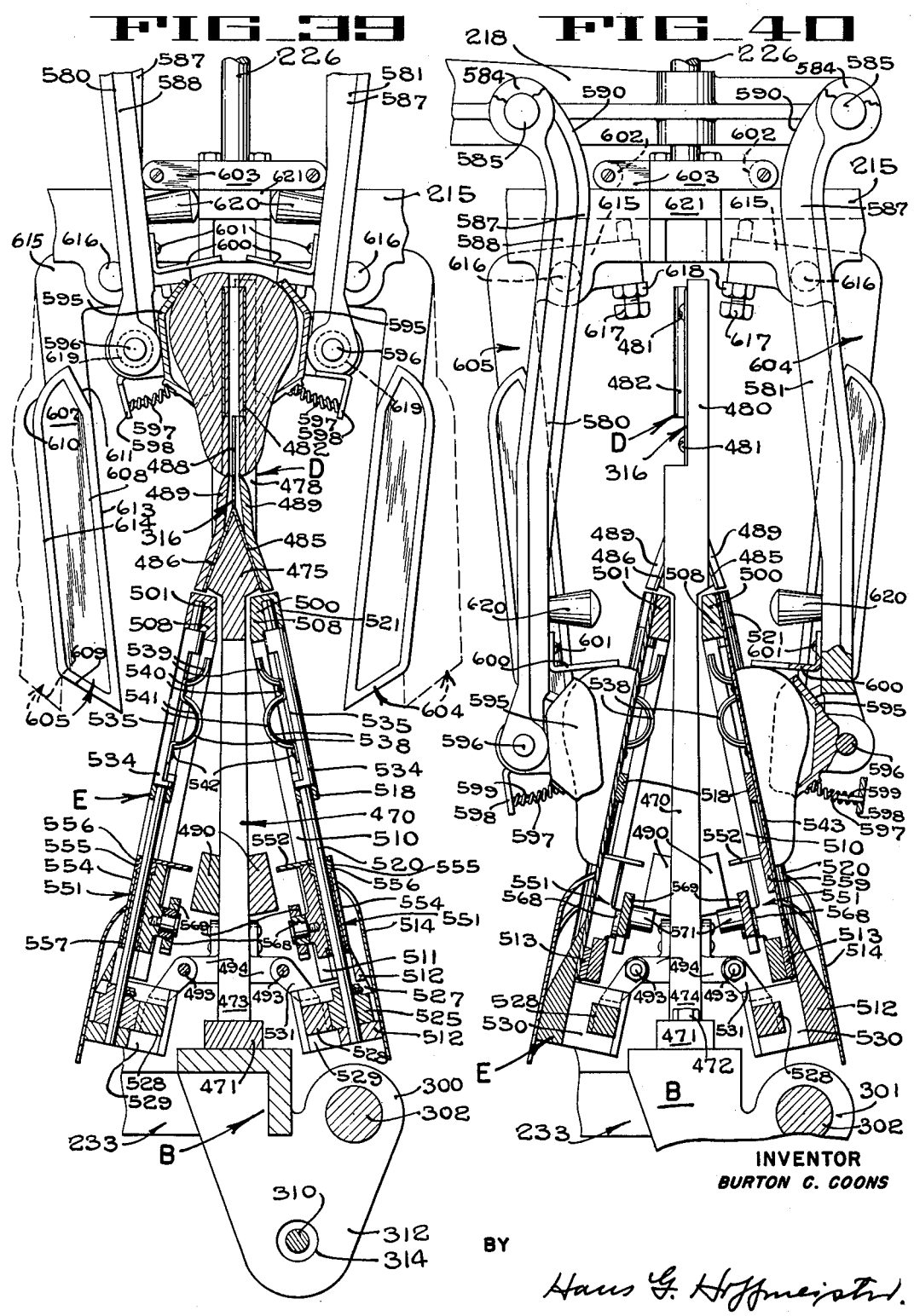

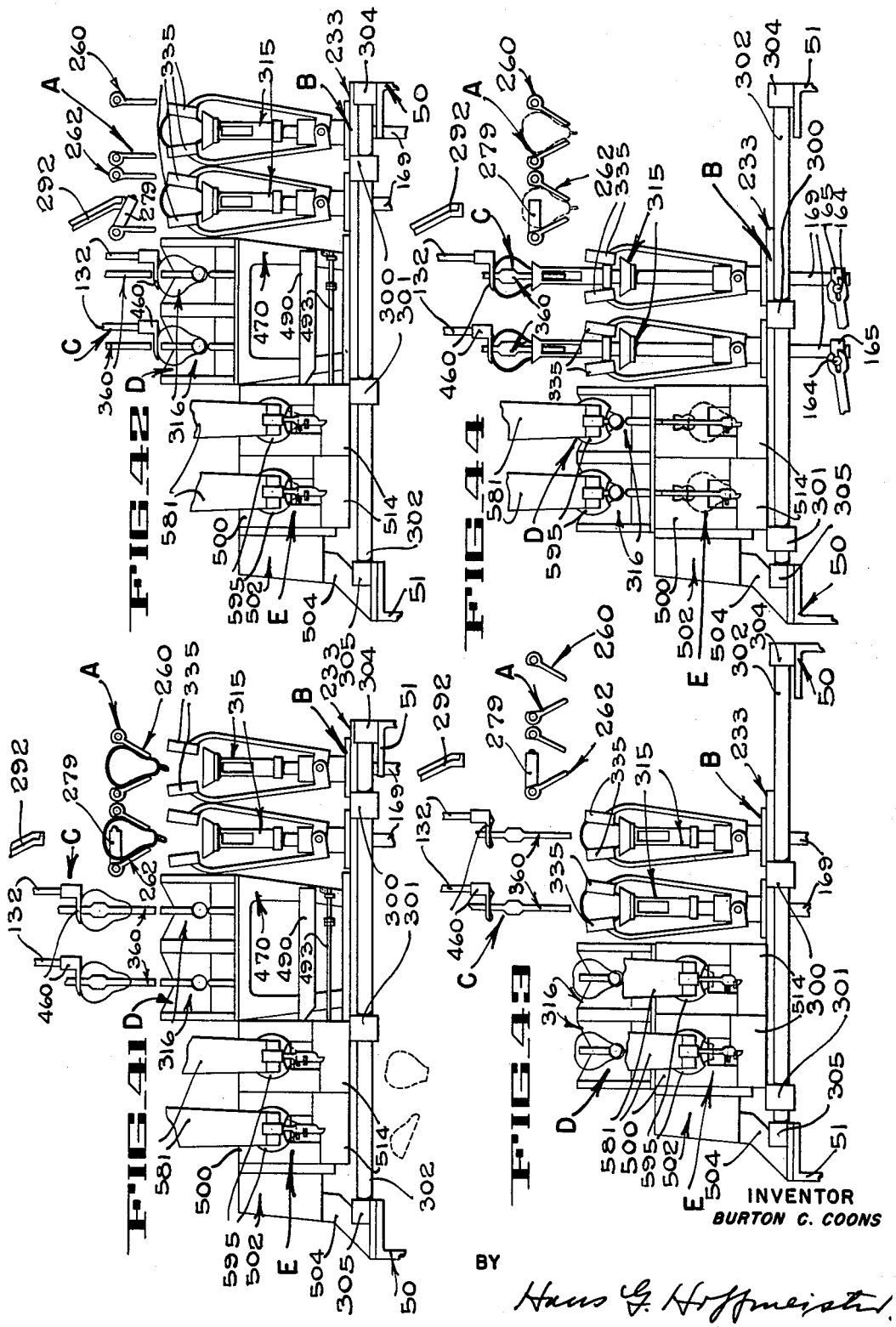

United States Patent Office 2,740,441
Patented Apr. 3, 1956

2,740,441

PEAR FEEDING, PEELING, HALVING, SEED CELLING, AND TRIMMING MACHINE

Burton C. Coons, San Jose, Calif., assignor to Food Machinery and Chemical Corporation, San Jose, Calif., a corporation of Delaware Application March 12, 1951, Serial No. 215,059

24 Claims. (Cl. 146—33)

The present invention relates to fruit preparation machines and is directed more particularly to a machine for peeling, coring, trimming and halving pears or other fruit preparatory to the packing or further processing thereof.

An object of the present invention is to provide an improved pear preparation machine.

Another object is to provide a simple and efficient pear preparation machine of large capacity.

Another object is to provide an improved pear preparation machine capable of processing large quantities of pears with a small amount of waste and with a minimum of operator attention.

Another object is to provide an improved pear preparation machine whereby a single operator is able to feed large quantities of pears into the machine without undue strain or exertion.

Another object is to provide a vertical feed, pear preparation machine capable of conducting simultaneously a multiplicity of preparation operations on a plurality of pears.

Another object is to provide a pear preparation machine having two alternately operable sets of processing mechanisms so that an operator can feed groups of pears to each set thereof alternately and thereby provide increased output of finished product.

Another object is to advance a pear in successive steps along a straight line path while moving it vertically at each successive step to perform successive operations on the pear.

Another object is to improve means for lifting a pear to axially impaled condition on a stemming tube, and for holding it so impaled during an initial peeling operation.

Another object is to provide a reciprocating carrier with improved pear holding and processing facilities to advance a pear from one processing stage to the next.

Another object is to provide a pear preparation machine with improved peeling facilities.

Another object is to provide a pear preparation machine with novel pear gripping and positioning mechanisms.

Another object is to move a pear from impaled condition on a stemming tube to impaled condition on a splitting blade.

Another object is to provide novel actuating and drive mechanism for a fruit preparation machine.

Another object is to improve the coring, seed celling, calyx and stem trimming mechanisms of a pear preparation machine.

These and other objects and advantages of the present invention will become apparent from the following description and the accompanying drawings in which:

Fig. 1 is a front elevation of a pear preparation machine embodying the present invention, portions thereof being broken away.

Fig. 2 is a view partly in section and partly in end elevation taken along line 2—2 of Fig. 1.

Fig. 3 is an enlarged plan view of the machine shown in Figs. 1 and 2.

Fig. 4 is a similarly enlarged horizontal section taken along line 4—4 of Fig. 1.

Fig. 5 is an enlarged fragmentary perspective view showing the upper portion of the left hand half of the machine shown in Fig. 1 as it would appear when viewed from the front and to the left of the machine.

Fig. 6 is a perspective view showing substantially the same portion of the machine as that illustrated in Fig. 5 as it would appear when viewed from the rear and slightly to the left.

Fig. 7 is a rear elevation of the lower portion of the machine in the direction of the arrows 7—7 in Fig. 2.

Fig. 8 is an enlarged fragmentary perspective view of the peeling head assembly.

Fig. 9 is a fragmentary section taken along line 9—9 of Fig. 4.

Fig. 10 is an enlarged exploded fragmentary perspective view showing one of the pear lift arms and its associated parts.

Fig. 11 is a fragmentary section taken along line 11—11 of Fig. 4, portions thereof being omitted and other portions being broken away.

Fig. 12 is a similarly enlarged horizontal section taken along line 12—12 of Fig. 1.

Fig. 13 is an enlarged fragmentary section taken as along line 13—13 of Fig. 11 showing a transfer cup and associated apparatus, but showing the transfer cup open whereas in the position shown in Fig. 11 the cups would be closed.

Fig. 14 is a plan view of the fragmentary transfer structure illustrated in Fig. 13.

Fig. 15 is a fragmentary section taken along line 15—15 of Fig. 14.

Fig. 16 is a fragmentary side elevation taken in the direction of the arrows 16—16 of Fig. 12 showing a pair of pears impaled upon the stemming tubes, and with the parts disposed in the positions they occupy at the initiation of a pear peeling operation.

Fig. 17 is a fragmentary perspective view of a peeling station with the peeling head in position for beginning the peeling operation, the position of a pear therein and of a supporting lift ring being indicated in broken lines.

Fig. 18 is a fragmentary perspective view showing a portion of the mechanism illustrated in Fig. 17 as the parts would appear substantially midway of the peeling of the bulb portion of a pear.

Fig. 19 is an enlarged fragmentary front elevation in the direction of the arrows 19—19 of Fig. 2 and shows a pair of peeling stations, portions of the right-hand one thereof being omitted and some of the parts on the right hand side being shown in vertical median section.

Fig. 20 is a fragmentary section taken along line 20—20 of Fig. 22 showing a peeling head guide frame with a pair of peeling units mounted for vertical slidable movement thereon, portions of the peeling units being broken away.

Fig. 21 is a section taken along line 21—21 of Fig. 22, portions of the peeling units being broken away.

Fig. 22 is a fragmentary section taken along line 22—22 of Fig. 20, portions of the peeling units being broken away.

Fig. 23 is an enlarged plan view of a pear pushoff member with a portion of a supporting rod shown sectionally.

Fig. 24 is a side elevation of the pushoff member and a fragment of its supporting rod shown in Fig. 23.

Fig. 25 is a section taken along the line 25—25 of Fig. 24.

Fig. 26 is a side elevation of a butt end peeling assembly, a portion only of the supporting rod therefor being shown.

Fig. 27 is a side elevation looking in the direction of the arrows 27—27 of Fig. 26.

Fig. 28 is a fragmentary side elevation showing a peeled pear being subjected to the action of the butt end peeler of Figs. 26 and 27, a portion of the pear being broken away to show pear rotating blades on the upper end of the stemming tube.

Fig. 29 is an enlarged fragmentary side elevation of a peeling unit actuating member forming part of a rocking peeling head support frame.

Fig. 30 is a side elevation of the peeling unit actuating member shown in Fig. 29, a portion of the rocking frame to which it is attached being broken away.

Fig. 31 is an enlarged fragmentary perspective view showing a peeling station with a pair of peeled pears in the process of being pushed downwardly off the stemming tubes to impaled condition on a pair of splitting blades.

Fig. 32 is a fragmentary side elevation in the direction of arrows 32—32 of Fig. 12, showing the splitting and seed celling stations, a pear being shown as it would appear impaled on the splitting blade at the downward limit of movement of the pusher member.

Fig. 33 is an elevation showing the opposite side of the mechanism illustrated in Fig. 32, the nearer of two sloping side plate portions for supporting pear halves during the calyx, seed cell and stem end severing operation being broken away.

Fig. 34 is a fragmentary horizontal section taken along line 34—34 of Fig. 33.

Fig. 35 is a fragmentary side elevation similar to the left hand portion of Fig. 32 but with the carriage in its rearward limit of movement, the splitting blades being indexed over their respective calyx, seed cell and stem end severing stations.

Fig. 36 is an enlarged plan view of a stem end trimming knife and gauging bracket, and their supporting frame block.

Fig. 37 is a perspective view of the assembly shown in Fig. 36, a portion of a supporting knife shaft being shown.

Fig. 38 is a fragmentary perspective view of a pear half as it would appear midway of the seed cell, calyx and stem end severing operation, portions being broken away to show the calyx, seed cell and stem end severing knives.

Fig. 39 is an enlarged fragmentary section taken as along the line 39—39 of Fig. 35, but showing a pair of gripping arms in the position they occupy at the beginning of the movement of the pear from the splitting blade downward onto the seed cell, calyx, and stem end severing station.

Fig. 40 is a view similar to Fig. 39 but taken as along line 40—40 of Fig. 32 and showing the gripping arms at the completion of their downward movement with the pear therein positioned over the calyx, seed cell and stem end severing station.

Figs. 41, 42, 43 and 44 are diagrammatic views, somewhat in the nature of side elevations, showing successive stages in a cycle of operation of the machine, the transfer cups being turned 90° from their true position to show their open or closed condition, a pair of pears being shown in heavy solid lines in the positions they would occupy during successive stages of a first complete reciprocation of a four-stroke cycle of the carriage, and in lighter solid lines in the positions these same pears would occupy during similar successive stages of the next complete reciprocation of the carriage, additional pears indicated in dotted lines in the various views being those associated with preceding or succeeding operative cycles of the machine.

GENERAL DESCRIPTION

In general the illustrative embodiment of the present invention is a fruit preparation machine comprising a fruit feed mechanism A (Figs. 1 and 2), a horizontally reciprocating fruit transfer carriage B, peeling and stemming mechanism C, splitting mechanism D, seed celling and end trimming mechanism E, and drive mechanism F.

It will simplify an understanding of the invention if it is borne in mind that the illustrated machine has eight similar sets of fruit handling mechanisms, which are divided into two groups of four each, one group being located on each side of the machine. Also, that the four sets of such mechanisms in each group operate together as a unit, the four mechanisms for performing each step in the preparation of the fruit operating in unison, and the mechanisms for performing successive steps operating in predetermined sequence. However, the two groups of mechanisms located on opposite sides of the machine are driven out of phase with one another, and therefore operate alternately, so that as the pears in the group of mechanisms on one side of the machine are being processed rearwardly through their successive stages of preparation, the mechanisms of the other group will complete their processing cycle and will move into position to receive a fresh supply of pears.

The successive steps of fruit preparation, namely, feeding, transferring, impaling, peeling, splitting, seed celling, end trimming and ejecting occur at different stages as the fruit progresses from front to rear through the machine. By this arrangement an operator can first drop four pears stem end down into the feed cups on one side of the machine, and then, while these four pears are being processed through their various stages of preparation, can drop four more pears into the alternately operating feed cups on the other side of the machine. This avoids the necessity for accurate timing on the part of the operator, and permits large volume output without undue strain or effort.

The two groups of operative mechanisms on opposite sides of the machine are counterparts of each other, and a description of the mechanisms of one group will apply, with certain obvious exceptions, to those of the other. Therefore, the parts of the mechanisms located to the left of a vertical longitudinal central plane through the machine as viewed in Fig. 1 will be designated by individual numbers, and will be described in detail, while the corresponding parts of the group on the other side of such central plane will be referred to only generally, and will be designated by the same numbers as those employed to designate their left hand counterparts, with the suffix "a" added.

While the present embodiment of the invention is particularly suited to the preparation of pears, it will be obvious that the invention can be employed in the preparation of other fruit, and as used throughout the present description and the attached claims the word "pear" is intended to include such other fruit.

The feed mechanism and portions of the transfer cups employed in the illustrated embodiment of the invention are disclosed in my Patent No. 2,431,310 issued November 25, 1947, while my Patent No. 2,187,075 issued January 16, 1940, shows a forerunner of the present development.

The illustrated embodiment of the invention comprises a base frame 50 (Figs. 1, 3, 4, 6 and 7), which may be of cast iron or steel, with a rectangular open top 51, and integrally cast supporting legs 52. A flat base plate 53 is secured transversely beneath the lower ends of the legs. Upper frame structure comprises a pair of side standards 54 and 55 of channel cross sectional shape mounted on opposite sides of the rectangular top 51 of the base frame, with a cast metal transverse top frame member 58 secured across their upper ends.

Two similar suspended frame assemblies 59 and 59a (Figs. 1, 2, 5, 6 and 19) are mounted, one centrally beneath each side of the transverse top frame member 58. Each depending frame 59 and 59a comprises two similar plates 60 and 61, connected together (Fig. 19), in vertically spaced relation, by four similar corner rods 62.

The upper and lower end portions of the corner rods 62 are of reduced diameter, and are inserted through holes provided near the four corners of the upper and lower frame plates 60 and 61 to receive them. The reduced threaded upper end portions of the rods are of sufficient length to project through holes 75 in the transverse top frame member 58, and nuts 63 are screwed onto the projecting upper ends of the rods 62 to suspend the frame assembly 59 from the transverse top frame member 58.

Each of the suspended frame plates 60 and 61 (Fig. 19) has four similar depending corner bosses 64, and a shorter central boss 65, formed on its under side, the corner bosses 64 being spaced inwardly from the four suspension rods 62. The four corner bosses 64 of each of the suspended frame plates 60 and 61 are drilled to receive bearing bushings 68 (Fig. 19) which provide journal support for a group of four rotary stemming tube drive spindles 70 to be described later herein. The central bosses 65 are drilled to receive flanged bearing bushings 71 for slidably mounting a peeling head actuating rod 72 also to be described later herein. An upwardly extending boss 73 is formed centrally of each side of the transverse top frame member 58 (Fig. 19), each of these latter bosses also being drilled and provided with a flanged bushing 74 slidably to receive the reciprocating peeling head actuating rod 72.

A pair of T-shaped feed cup support standards 80 and 81 (Figs. 1, 2, 3, 5 and 11) are mounted one on each side of the rectangular top of the base frame 50 for pivotally mounting the outer ends of a plurality of feed cup support shafts to be described later herein. A third standard 82 is mounted centrally on the transverse front member of the rectangular top of the base frame 50, and has a rearwardly extending cantilever top portion 83 (Fig. 5), with bearing openings therein for pivotally mounting the inner ends of the feed cup support shafts. The rearward end of the cantilever top portion 83 is forked, at 84 to clear a vertically reciprocating forwardly extending portion of a peeling unit, to be described later herein. Additional minor frame elements for supporting operating parts of the illustrated machine will be described in connection with the particular mechanisms to which they appertain.

*Drive mechanism*

The drive mechanism comprises a main drive shaft 90 (Figs. 1, 2, 4, 7, 9 and 11) journaled in a plurality of transversely aligned generally identical bearing brackets 91 bolted onto the base plate 53. A gear 92 (Figs. 1, 3, 4 and 7) is keyed to an end of the drive shaft 90 and is in meshed, driven engagement with a drive pinion 93 keyed to the shaft of an electric motor 94.

Two complete duplicate sets of cams are provided on the main drive shaft 90, one set being provided on each side of the center of the machine as viewed in Figs. 1 and 4. Although each cam on the left hand side of the center line of the machine as viewed in Fig. 1 is duplicated on the right hand side of the machine, the cams of the two sets are not mounted in the same successive order from left to right along the drive shaft 90 in order to facilitate connecting them to the various mechanisms which they operate. The cams on each side of the machine are mounted 180° out of phase with their respective counterparts on the other side, so that the mechanisms associated with the two sets of cams will be operated in the same sequence, but in alternate succession.

The cams on the left hand side of the shaft 90 and the drive mechanisms actuated thereby will be described in sequence beginning at the left hand end of the main drive shaft. The corresponding cams and drive mechanisms on the right hand side of the shaft will be designated only generally, since, being duplicates, their structure and operation are substantially similar to those to be described for their left hand counterparts.

The cam 95 (Figs. 1, 2 and 4) on the left hand end of the drive shaft 90 is for actuating a stem ejector mechanism. This stem ejector actuating cam has a channel cam track 98 (Fig. 2) formed in a side thereof in which a cam follower roller 99 rides. The cam follower roller 99 is journaled on a laterally extending pin 100 mounted on the side of a thrust link 101 near its lower end. The thrust link has a slotted opening 102 therein to receive the drive shaft 90 to assist in guiding the link 101 for vertical reciprocating movement under the action of the cam. A connecting rod 103 is secured to extend endwise from the upper end of the thrust link 101, and passes through a guide hole drilled in the lower end of a bracket 104 (Figs. 1 and 2) mounted beneath one side of the top of the base frame 50.

The upper end of the connecting rod 103 (Figs. 1, 2, 3 and 5) is pivotally connected to the outer end of a tilting lever 105, fulcrumed in the yoked upper end of a bracket 108 mounted on the transverse top frame member 58 to extend upwardly therefrom. The inner end portion 106 of the tilting lever 105 is yoked (Figs. 1, 2, 3 and 5) to clear the upright, reciprocating peeling head actuating rod 72, and each end of the yoked portion of the tilting lever 105 is bifurcated, as at 107 (Fig. 1), slidably to receive one of a pair of similar actuating pins 109 mounted to project inwardly from the vertical sides of a box frame 110 slidably mounted on the peeling head actuating rod 72 above the transverse top frame member 58. Four diagonally extending arms 111 (Figs. 1, 2 and 3) are secured by screws 112 to the upper side of the slidably mounted box frame 110, and the outer end of each of these arms is secured (Figs. 1 and 3) to the upper end of a stem ejecting pin 113 to be described later herein.

The other stem ejector actuating cam 95a on the right hand portion of the main drive shaft 90, as viewed in Figs. 1 and 4, corresponds to the stem ejector cam 95 just described, and is similarly connected by a connecting rod 103a and tilting lever 105a to a vertically reciprocable box frame 110a slidably mounted on the peeling head actuating rod 72a for actuating the stem ejector pins 113a on the right hand side of the machine as viewed in Fig. 1.

The second cam 120 from the left hand end of the main drive shaft 90 as viewed in Figs. 1 and 4, is for actuating the mechanism for pushing the pears, after they have been peeled, from impaled condition on the stemming tubes, downward to impaled condition on the splitting blades in a maner to be described later herein. This pusher actuating cam 120 is of the same general type as the stem ejector actuating cam 95 just described, having a usual channel track in its side with a roller riding in this track and connected to a thrust link 121 slotted to receive the main drive shaft 90, to guide the thrust link for vertical reciprocation.

A connecting rod 122 extends upwardly from the upper end of the thrust link 121, the upper end of the connecting rod being pivotally connected to the outer end of a tilting lever 123 (Figs. 1 and 5) similar to the lever 105, and fulcrumed on a bracket 124 mounted on the upper frame side standard 54. The inner end of the tilting lever 123 is connected, similarly to the lever 105, to actuate a box frame 128 which is slidably mounted on the upright, reciprocable peeling head actuating rod 72 between the upper and lower plates of the suspended frame 59. The box frame 128 is similar to the previously described box frame 110 for actuating the stem ejector pins, but is mounted on the peeling head actuating rod 72 in inverted position from that of the frame 110.

Four diagonally outwardly extending arms 129 (Figs. 1, 2, 5, and 19) are mounted by screws 130 on the under side of the box frame 128, the outer end of each of these arms being connected by set screws 131 (Fig. 19) to the upper end of a pusher support rod 132. The corresponding pusher actuating cam 120a on the right hand side of the machine as viewed in Figs. 1 and 4 similarly reciprorocates a thrust link 121a, connecting rod 122a, yoked tilting lever 123a and box frame 128a.

The third cam 135 from the left on the main drive shaft 90 as shown in Figs. 1 and 4 acts to lift the pears upwardly from the transfer cups to impale them on their respective stemming tubes in a manner to be described later herein. This third or pear lift cam 135 is of the same general type as the stem ejector and pusher actuating cams described previously herein, having a usual channel cam track 138 in its side in which (Fig. 9) a cam follower roller 139 is adapted to ride. The roller 139 is pivotally mounted on an intermediate portion of a generally upright rocking lever 140, the lower end of which is pivotally connected to a bracket 141 secured to the base plate 53. The upper end of the rocking lever 140 is pivotally connected to the forward end of a link 142 which extends horizontally rearwardly and has its rear end pivotally connected to the lower end of a depending actuating lever arm 143 secured by a set screw 144 (Fig. 10) to the forward one of a pair of rock shafts 145 and 146 (Figs. 2 and 11).

The rock shafts 145 and 146 are journaled in bearings 148, 149, 150 and 151 (Fig. 4) which are mounted one on each of the four upwardly extending corner posts of a box-like standard 152 secured to the base plate 53. The front and rear walls of the standard 152 are parallel to the main drive shaft 90, but the end walls thereof (Fig. 4) are disposed at an acute angle to the front and rear walls, so as to offset the corner bearings 150 and 151 for the rear rock shaft 146 to the right, as viewed in Figs. 1 and 4 from the bearings 148 and 149 for the front rock shaft 145. The front and rear rock shafts 145 and 146 are connected together for synchronous rocking movement (Figs. 2 and 4) by a link 153 pivotally connected between the lower ends of a pair of depending lever arms 154 and 155 secured one to the outer end of each rock shaft.

Two pear lift arms 158 and 159 (Fig. 4) are pivotally mounted in laterally spaced relation on the forward rock shaft 145, and two similar lift arms 160 and 161 are similarly mounted on the rear rock shaft 146 in laterally offset relation to those on the front shaft. Each pear lift arm has a downwardly bowed portion 162 therein which permits the rear lift arms to clear the front rock shaft 145 when swung upwardly during a pear lifting movement of the arms. The forward end of each lift arm is forked as at 163 (Figs. 2, 9 and 11) to receive a roller 164 (Figs. 9, 11 and 13) pivotally mounted on a side of a block 165 secured in adjusted position on the lower end of a vertically reciprocable pear lift rod 169. The rollers 164 for the blocks of each pair of lift rods 169 located one in front of the other are mounted on opposite sides of their respective blocks 165 so that the forked lift levers for engaging the rollers of said pair of lift rods can be mounted in laterally spaced relation to each other (Figs. 1 and 4).

The depending actuating lever 143 secured to the front rock shaft 145 has a forwardly extending arm 170 at its upper end (Fig. 10) with a laterally offset end portion in which a lift arm abutment screw 171 is secured in adjusted position by a lock nut 172. An ear 173 also is formed on a side of the depending actuating lever 143 to be disposed directly rearwardly of the rear edge of the bowed portion 162 of the lift arm. A second abutment screw 174 is secured by a lock nut in adjusted position in a hole in the ear 173 to engage the rear edge of the downwardly bowed portion 162 of the associated lift arm.

By securing the abutment screws in adjusted position by their respective lock nuts, the limits of relative pivotal movement between the lift arm 158 and its associated actuating lever 143 can be closely adjusted. A lift arm actuating fitting 175 (Figs. 4 and 11), similar to the actuating lever 143 except that the depending arm portion below the ear 173 for the lower abutment screw 174 is omitted, is secured to the rock shafts 145 and 146 adjacent each of the other three lift arms to limit their relative pivotal movements about their respective rock shafts. The three actuating fittings 175 are all provided with abutment screws 171 and 174 similar to those on the actuating lever 143.

Each of the four lift arms 158, 159, 160 and 161 is independently spring biased by a torque coil spring 180 (Figs. 1, 4 and 10) to urge its free forward end upwardly into abutment with its associated upper abutment screw 171. Each spring 180 encircles the sleeve portion of a flanged sleeve 181 secured in rotatively adjusted position on the rock shaft adjacent its associated lift arm. The ends of the spring are inserted, one in a hole in its associated lift arm, and the other in a hole in the flange portion 182 of the flanged sleeve 181. A plurality of recesses 183 (Fig. 4 and 10) are provided in the periphery of each flange portion 182 to receive an ordinary spanner wrench, not shown, for turning the flanged sleeve 181 on its rock shaft to adjust the torque exerted by the spring on its associated lift arm.

Each flanged sleeve 181 is secured in rotatively adjusted position on its rock shaft by having its flange portion 182 (Figs. 2 and 10) clamped to the side of a flanged collar 184 secured by a set screw 185 to its rock shaft (Fig. 10). The flange of the collar 184 has a pair of arcuate slots 188 therein to receive the shanks of a pair of cap screws 189, which then are screwed into threaded holes in the sleeve flange 182 and are drawn down tight to clamp the flanges of the collar 184 and of the sleeve 181 securely together in adjusted position.

A corresponding lift cam 135a on the right hand side of the machine as shown in Figs. 1 and 4 is similarly connected to operate a rocking lever 140a, horizontal connecting link 142a, rock shafts 145a and 146a, and the right hand set of four similar spring biased lift arms 158a, 159a, 160a, and 161a.

The next, or fourth cam 190 from the left hand end of the main drive shaft 90, as shown in Figs. 1 and 4, is for operating the peeling mechanism. This cam 190 (Figs. 1 and 4) is of the same general type as those previously described, with a usual channel cam track in a side thereof for operating a vertically reciprocable, slotted thrust link 191. The upper end of the thrust link 191 is connected to the peeling head actuating rod 72 on which the box frames 110 and 128 are slidably mounted. The peeling head actuating rod 72 extends upwardly (Fig. 19) through the central bushings 71 (Fig. 19) in the plates 60 and 61 of the depending frame assembly 59 and through the aligned bushing 74 in the transverse top frame member 58.

A peeling unit actuating bracket 192 (Figs. 1, 5, 17, 19 to 22, inclusive and 31) with two oppositely extending angularly bent arms 193 and 194 thereon (Fig. 22), is secured in adjusted position by set screws 195 on the peeling head actuating rod 72 below the suspended frame 59. A butt end peeler actuating spider 196 (Figs. 1, 2, 5, 6 and 19) made in complementary halves, also is clamped onto the peeling head actuating rod 72 below the pusher actuating box frame 128. Both the peeling head actuating bracket 192 and the butt end peeler actuating spider 196 will be described more fully later herein.

The peeling head actuating cam 190a for the right hand side of the machine as viewed in Fig. 1 is connected, similarly to the cam 190, by a thrust link 191a and peeling head actuating rod 72a, to the right hand peeling head actuating bracket 192a and butt peeler actuating spider 196a.

The next, or fifth, cam 200 from the left hand side of the machine on the main drive shaft 90, as shown in Figs. 1 and 4, actuates fruit gripping mechanism which grips the pears after they are peeled and impaled on the splitting blades and moves them downward across the splitting blades onto a seed cell, calyx and stem end severing station all in a manner to be described later herein.

The gripper actuating cam 200 is of the same general type as the other cams on the main drive shaft 90, with a cam track in a side thereof to receive a usual cam roller mounted midway of the length of a generally horizontal lever 201 (Fig. 11). The forward end of the lever 201 is pivotally mounted on a standard 202 secured to the base plate 53, and the rearward end of the lever 201 is forked to receive a roller 203, mounted on the side of a block 204 secured in adjusted position on a vertically reciprocable gripper actuating rod 205 by set screws 208.

The gripper actuating rod 205 is an assembly, with a lower rod portion 209 thereof slidably inserted in a bearing standard 210 secured to the base plate 53. The upper end of the lower rod portion 209 is secured by set screws 211 in a hole in an offsetting block 212, and an upper rod portion 213 is secured by set screws 214 in a second hole in the offsetting block 212 so that the upper rod portion 213 is offset forwardly from the lower rod portion 209. The upper rod portion 213 is mounted for vertical sliding movement in a bearing opening in a transverse gripper support frame member 215 (Figs. 2, 3 and 7) mounted across the upper ends of a pair of standards 216 and 217 on the base frame 50 rearwardly of the upper frame side standards 54 and 55.

A crosshead 218 (Figs. 2, 3, 6 and 7) is secured in adjusted position, by set screws 219, near the upper end of the gripper actuating rod 205. A pair of guide studs 226 (Figs. 2, 3, 6 and 7) are screwed into threaded holes in the transverse frame member 215 to extend upwardly therefrom parallel to the gripper actuating rod 205. The crosshead 218 has bearing openings therein slidably to receive the guide studs 226 which prevent rotative displacement of the crosshead during its vertical reciprocation by the gripper actuating rod. The gripper arms, to be described later herein, are mounted on the crosshead.

The corresponding gripper actuating cam 200a on the right hand side of the machine as shown in Figs. 1, 2, and 4, has an associated actuating lever 201a, vertically reciprocating, actuating rod 205a and crosshead 218a all mounted in a manner similar to that just described for the left hand gripper actuating mechanism.

The sixth cam 220 from the left hand end of the machine as shown in Fig. 1 is the carriage actuating cam (Figs. 1, 4 and 11) and is the last of the series of cams on the main drive shaft 90. This cam, 220, like the others on the main drive shaft, has a channel cam track 221 (Fig. 11) in a side thereof in which a cam follower roller 222 rides. The roller 222 is pivoted on a side and near the rear end of a forwardly extending thrust link 223, the thrust link having a slotted guide opening 224 therein to receive the main drive shaft 90. The forward end of the thrust link 223 is pivotally connected to the lower end of a rocking lever 225 which in turn is pivotally mounted on the upper end of the same standard 202 which supports the forward end of the gripper actuating lever 201.

The carriage actuating lever 225 has its lower and upper portions 228 and 229 offset laterally from each other (Figs. 1, 4 and 11), the lower portion 228 being on one side of the standard 202 and the upper portion 229 on the other side thereof. These two laterally offset portions of the lever 225 are rigidly connected to each other by an integrally formed loop 230 which extends around the upper end of the standard 202, having sufficient clearance therefrom to permit free rocking movement of the lever through the angle necessary to operate the transfer carriage. The upper end of the carriage actuating lever 225 is pivotally connected to the rearward end of an H-shaped link 231 (Figs. 11 and 12), the forward end of which, as best shown in Fig. 11, is pivotally connected to a bracket 232 which in turn is secured to the under side of the forward cross bar of the U-shaped frame 233 of the transfer carriage B to be described later herein.

The corresponding right hand carriage actuating cam 220a is connected in a similar manner, by a thrust link 223a and rocking lever 225a, to the U-shaped frame 233a of the right hand transfer carriage Ba.

The stemming tube spindles 70 (Figs. 1, 2, 3, 5 and 6) are driven in rotation continuously and at a uniform speed during the operation of the machine, but do not reciprocate. The driving mechanism for thus rotating the stemming tube spindles in place comprises eight similar sprocket wheels 234 (Fig. 3) keyed one to the upper end of each stemming tube drive spindle. A drive chain 235 is trained around these eight sprockets 234 and also around idler sprockets 238, 239 and 240 journaled on studs on the upper transverse frame member 58. The drive chain 235 also is trained around a drive sprocket 246 keyed to the upper end of a vertical drive shaft 241 (Figs. 1, 2, 3, 4 and 7) in the rearward part of the machine.

The upper end of the drive shaft 241 is journaled in a bearing bracket 242 (Fig. 2) secured to the upper transverse frame member 58, and its lower end is journaled in a bearing bracket 243 (Figs. 4 and 7) mounted on the base plate 53. A bevel gear 244 (Figs. 4 and 7) is keyed to the lower end of the vertical drive shaft 241, and is in meshed driven engagement with a second bevel gear 245, keyed to a short shaft 247 journaled in the bearing bracket 243. A pinion 248 (Fig. 7) is keyed to the same short shaft 247 as the bevel gear 245, and is in meshed driven engagement with an intermediate idler gear 249, mounted on a bracket 250 secured to the base plate 53. The idler gear 249 in turn, is in meshed driven engagement with a gear 251 keyed to the motor driven main drive shaft 90 (Figs. 1, 4 and 7).

*Feed mechanism*

The pear feed mechanism comprises two groups A and Aa of four feed cups each, one group thereof being provided for each of the two sides of the machine. With slight exceptions the two groups of feed cups are similar to each other. Therefore, only the left hand group thereof as shown in Figs. 1, 3, 5 and 11 will be described in detail and the slight differences between the two groups will be pointed out later herein.

The left hand group of four feed cups comprises two front feed cups 260 and 261 (Figs. 1, 3, 5 and 11) and two rear feed cups 262 and 263 each adapted to receive a pear stem end down therein. Each feed cup comprises half portions 264 and 265, each defining substantially the diagonally divided half of a truncated inverted pyramid. Each feed cup half portion has a transversely drilled mounting boss 267 (Figs. 3 and 5) at the upper corner thereof to receive a horizontal mounting shaft to which it is secured in adjusted position by set screws 268 (Figs. 3 and 5).

The mounting shafts 269 and 270 for the front and rear halves, respectively, of the forward pair of feed cups 260 and 261 and the shaft 271 for the front halves of the rear feed cups 262 and 263 are all alike, and are mounted in bearing openings provided in the upper portions of the T-shaped end standard 80 and the central frame standard 82 (Figs. 1 and 2, 3, 5 and 11). The rear halves 264 of the rearward pair of feed cups 262 and 263, however, are mounted on a rock shaft assembly 272 comprising end portions 277 and 278 secured together in endwise spaced, axially aligned relation by a forwardly bowed feed cup actuating insert 279 which may be a bronze casting. This bowed insert 279, like the forked rear end 84 of the top portion of the central feed cup standard 82, also provides clearance to permit vertical reciprocating movement of a peeling unit 280 (Figs. 3 and 5) to be described later herein.

The front and rear rock shafts supporting the half portions of each pair of feed cups are connected together for reverse rocking movement by arms 281 and 282

(Figs. 3 and 5) the end of each rearward arm 282 being bifurcated to receive a roller 283 pivoted on the free end of the associated forward arm 281. The forward rock shafts 269 and 271 of both the front and rear feed cups are connected together for synchronous rocking movement by a link 284 (Fig. 5) which is pivotally connected between the lower ends of a pair of depending lever arms 287 and 288 secured, by set screws, to the opposite ends of the rock shafts 269 and 271 from the lever arms 281 and 282. A counterweight 289 (Figs. 5 and 11) on the end of a rearward extension 290 of the arm 282 urges the rearward rock shaft 272 to which it is secured in a clockwise direction as illustrated in Fig. 11, and, by means of the linkage inter-connecting the feed cup support shafts, urges all of the feed cups toward a normally closed, or fruit receiving condition. A stop screw 291 (Figs. 2 and 11) is screwed through a threaded hole in a laterally offset portion of the arm 282 on the rear feed cup shaft and is adapted to engage the under side of the rearward extension of the T-shaped standard 80 and thus limits the closing movement of the cups under the impulse of the counterweight 289.

A feed cup actuating arm 292 (Fig. 5) is rigidly secured to the forward side of the previously described pusher actuating box frame 128. The arm 292 extends forwardly and downwardly from the pusher box frame 128, and the lower end of the arm is positioned to strike the forwardly bowed insert 279 in the rear feed cup support shaft 272 on a reciprocating movement of the box frame to tilt the rear feed cup mounting shaft 272 in a counter-clockwise direction from the position illustrated in Fig. 11. This tilting of the rear feed cup mounting shaft 272, by means of the inter-connecting linkage described previously herein, swings all of the feed cups to their open position, dropping the pears therein stem end down through the feed cups.

The four feed cups 260a, 261a, 262a, and 263a for the right hand side of the machine as viewed in Figs. 1 and 3 are similar to their left hand counterparts just described, with the exception that two bowed inserts 279a and 279b (Fig. 3) are mounted in the rear feed cup support shaft 272a to provide clearance for the two forwardly extending angularly mounted peeling units 280a on the right hand side of the machine.

*Transfer mechanism*

Two transfer carriages B and Ba (Figs. 1, 2, 11 and 12) are provided, one for each side of the machine, but since they are similar to each other, only the left hand one B as shown in Fig. 1 will be described. The horizontal U-shaped carriage frame 233, mentioned previously herein, may be of cast metal, with a pair of laterally extending support brackets 300 and 301 secured in longitudinally spaced relation to each leg thereof. Each pair of these brackets (Figs. 2, 11 and 12) slidably receives one of a pair of track rods 302 and 303 mounted in axially parallel relation to extend between brackets 304 and 305 mounted on the front and rear sides, respectively, of the rectangular, open top of the base frame 50.

A pair of buffer springs 307 and 308 (Figs. 11 and 12) are mounted with a press fit on the large diameter end portions 309 of each of a pair of buffer spring support rods 310 and 311 which are mounted to extend between the front and rear members of the rectangular top of the base frame 50, and parallel to the carriage track rods 302 and 303. The inner ends of the buffer springs extend in cantilever supported condition out over the smaller diameter intermediate portions of the buffer spring support rods 310 and 311, and are adapted to be engaged by downwardly extending arresting brackets 312 and 313 (Fig. 11) mounted in longitudinally spaced relation on each leg of the U-shaped carriage frame. Each arresting bracket has an opening 314 (Fig. 13) therein to receive the associated spring support rod 310 or 311.

The buffer springs 307 and 308 assist in arresting the movement of the carriage at both ends of each reciprocative stroke thereof, and in storing the arresting energy for assisting in the initiation of the return stroke of the carriage. They also take up any slack in the connections between the carriage actuating cam 200 and the carriage B to permit accurate indexing of the transfer cups and splitting blades on the carriage during feeding, impaling and transferring of the pears in a manner to be described later herein.

The four similar transfer cups 315 (Figs. 1, 2, 11, 12, 13, 14, 15 and 16) are mounted on the forward portion of the carriage B, and four splitting blades 316 (Figs. 12, 31, 39 and 40) are mounted on the rear portion of the carriage. The four transfer cups are positioned on the carriage so that at the forward limit of carriage movement they will be indexed directly beneath the four feed cups, which they serve, and at the rearward limit of carriage movement they will be indexed directly beneath the four stemming tubes. The splitting blades are spaced apart and mounted on the carriage in a similar pattern so that at the forward limit of carriage movement they will be indexed directly beneath the four stemming tubes associated therewith, and at the rearward limit of carriage movement will be indexed above four seed cell, calyx, and stem end severing stations to be described later herein.

The transfer cups 315 are all similar to each other, so that one only thereof will be described in detail. Each transfer cup 315 (Figs. 13, 14, 15 and 16) comprises an upright tubular base portion 317 with forwardly and rearwardly extending ears 318 formed thereon to receive cap screws 319 by which the upright tubular base portion 317 is mounted on a leg of its supporting U-shaped carriage frame 233, the bore of the tubular base portion being in register with a hole in the leg of the carriage to permit the slidable insertion of one of the pear lift rods 169 in each thereof.

A downwardly extending guide arm 320 (Fig. 13) is formed integrally with each tubular base portion 317 and is offset laterally to pass around the carriage U-frame 233. A laterally offset guide portion 321 at the lower end of the guide arm 320, has a hole therethrough in axial alignment with the bore of the tubular base member 317, slidably to receive the pear lift rod 169 mounted in the associated tubular base member 317 and to guide the rod for vertical reciprocation therein. A feather key 322 (Figs. 11 and 13) is mounted longitudinally of the pear lift rod 169, and rides in a keyway provided therefor in the offset lower guide portion 321 on the depending guide arm 320 to retain the lift rod 169 against rotative movement.

Each lift rod 169 has one of the actuating blocks 165 (Figs. 11 and 13) mentioned previously herein secured in adjusted position on its lower end by a set screw 168, with the roller 164 on the side of the block adapted to enter the forked forward end 163 of its associated lift arm at the rearward limit of carriage movement.

A stop collar 323 (Fig. 15) is mounted on each lift rod 169 near its upper end to limit the downward slidable movement of the lift rod. A cap 324 is fitted over the upper end of each lift rod 169, and a pair of vertical arms 327 (Figs. 11, 15 and 16) extend upwardly from opposite sides of the cap. A small inverted truncated conical pear thrust or lift ring 328 is mounted across the upper ends of the arms 327 and is adapted to receive and center the stem end of a pear dropped into the transfer cup by the opening of the feed cup when the carriage is in its forward position, and to maintain the pear in centered position therein during an upward stroke of the lift rod 169 (Fig. 16) when the carriage is in its rearward position to lift a pear resting in the transfer cup and impale it along its stem blossom axis on a stemming tube.

The lift ring 328 is mounted (Fig. 15) co-axially within the cylindrical lower portion of a larger inverted truncated conical receiving ring 329, which has cantilever support on the upper end of a single upwardly extending arm 330 (Figs. 13 and 16) secured at its lower end, by screws 331, to a side of the tubular base member 317. The inner walls of the two conical rings 328 and 329 are substantially co-extensive when the lift ring 328 is in its lowered or normal position as shown in Fig. 15. A guide finger 332 extends upwardly from the upper end of the arm 330 and alongside the larger stem end centering ring 329 for guiding the stem end of a pear dropped into the transfer cup to centered position therein.

A pair of similar, but opposite, bulb end centering arms 333 and 334 (Figs. 11, 12, 13, 14, 15 and 16) are hingedly mounted on opposite sides of the tubular base member 317 to extend upwardly therefrom. An angularly bent, bulb centering plate portion 335 has cantilever support on the upper end of each of the arms 333 and 334 (Fig. 16), these plate portions being adapted to engage the generally spherical bulb end of a pear in the transfer cup to center it therebetween when the arms 333 and 334 are urged toward each other in a manner to be described later herein.

The lower ends of the bulb end centering arms 333 and 334 are pivoted on the projecting end portions of a pair of pivot pins 337 and 338 (Figs. 13, 15 and 16) secured by set screws 339 in drilled bosses 340 and 341 on the upper end of each tubular transfer cup base 317. Loops 342 and 343 formed integrally with the lower ends of the arms 333 and 334, respectively, span the bosses 340 and 341 and are pivoted on the opposite projecting ends of the pivot pins 337 and 338 to hingedly mount the arms 333 and 334 on the base member 317. The bulb centering arms 333 and 334 are connected together for reverse tilting movement by a pair of inwardly extending lever arms 344 and 345 (Figs. 13, 14 and 16) formed integrally with the bulb centering arms 333 and 334, respectively. A sliding block 347 (Fig. 13) is mounted in a grooved slot cut in the arm 344, the block having a pin 348 extending laterally therefrom and inserted for pivotal movement in a hole in the free end of the other arm 345. The bulb centering arms 333 and 334 are spring biased toward each other by a torsion coil spring 349 (Figs. 14 and 16) which encircles an extending portion of the pivot pin 337. One end of the spring is inserted in a hole in the arm 344 while its other end is inserted in a hole in a collar 350 secured by set screws 351 in adjusted position on the pivot pin 337.

A downwardly extending cam actuated arm 352 (Figs. 13 and 16) with a cam follower roller 353 rotatively mounted on its lower end is formed on the outer boss of each bulb centering arm 333. As the carriage B approaches its forward limit of movement, the roller 353 is adapted to ride onto the offset rear end portion of a stationary cantilever cam track 354 (Figs. 11, 12 and 13) secured by a bracket portion 355 on its forward end to the transversely extending front member of the open rectangular top 51 of the base frame 50. This forces the roller 353 inwardly toward the longitudinally center line of the carriage, and tilts its associated bulb centering arms 333 and 334 to their open or fruit receiving positions (Fig. 13). It will be noted by referring to Fig. 12, that the cantilever cam tracks 354 are opposite hand, hence, the bulb centering arms 333 and 334 must also be opposite hand to conform and cooperate with such cam tracks, i. e., the arms 333 and 334 on the left hand side in Fig. 12 will be left hand, while those on the right hand side of such figure will be right hand.

At the forward limit of carriage movement, the four transfer cups mounted on the carriage are indexed directly beneath their respective feed cups, which are then opened by the lower end of the feed cup actuating arm 292 engaging the bowed insert 279 in the rear feed cup support shaft 272. This discharges the pears stem end down into the open transfer cups indexed therewith. The carriage B then moves rearwardly, the cam follower rollers 353 passing beyond their respective cam tracks 354, and allowing the torsion springs 349 to swing the bulb centering arms of each pair thereof toward each other, whereby the angularly bent plate portions 335 on the upper ends of the arms 333 and 334 urge the bulb end of the pear to centered position therebetween. Since the co-axial inverted cone shaped rings 328 and 329 tend, funnel-like, to center the stem end of a pear dropped therein from the feed cup, this subsequent centering of the bulb portion of the pear brings the stem blossom axis of the pear vertical.

As the carriage B approaches the rearward limit of its travel, it is engaged by the rear buffer springs 308 which assist in bringing the carriage to a stop and take up any play in the operative connections between the carriage actuating cam 220 and the carriage to index the pears with their upright stem blossom axes directly beneath their respective stemming tubes to be described later herein.

As the carriage approaches its rearmost limit of travel the four rollers 164 journaled on the blocks 165 secured to the lower ends of the transfer cup lift rods 169 enter the forked forward ends of their respective lift arms 158, 159, 160 and 161, and, as the carriage comes to rest in the position illustrated in Fig. 11, and for the near carriage B in Fig. 2, the lift cam 135 and associated mechanism cause the lift arms to swing upwardly, elevating the inner lift rings 328, and impaling the pears in the transfer cups along their stem calyx axes on the rotating stemming tubes (Fig. 16).

*Stemming tubes*

A stemming tube 360 (Fig. 19) is screwed into a threaded socket in the lower end of each of the four vertical tubular stemming tube drive spindles 70 of each of the two groups thereof, and is secured by set screws therein. The bores of the stemming tubes form continuations of those of their respective tubular spindles. The stemming tube spindles 70, as mentioned previously herein, are journaled to rotate in place in bearings in the suspended frame assembly 59, and are driven to rotate continuously during operation of the machine by the drive chain 235. A positioning collar 361 is secured in adjusted position on each stemming tube spindle beneath the corner boss 64 of the upper plate 61 of the suspended frame assembly 59 to prevent upward displacement of the spindle, while the hub of the stemming tube drive sprocket 234, riding on the radially extending flange of the upper bearing bushing 68 prevents downward displacement of the spindle.

Each stemming tube 360 has a thin walled tubular lower portion 362 with sharpened lower edge adapted to penetrate the pear along its stem-blossom axis when the pear is lifted to impaled position on the stemming tube by the elevation of the inner or lift ring 328 to sever a cylindrical axial core portion of the pear and to force it into the stemming tube. This cylindrical axial core portion includes the stringy stem portion of the pear and a portion of the seed cell, but is referred to herein merely as the "stem."

A plurality of radially extending pear turning blades 363 are formed near the upper end of each stemming tube 360, each of the blades having a slight helical curve therein to facilitate their penetration into a pear to initiate its rotation about the stemming tube axis.

*Peeling mechanism*

One of the peeling units 280 (Figs. 1, 2, 5, 16, 17, 18, 19, 20, 21 and 22) is mounted adjacent each stemming tube, the peeling units being mounted in angularly offset, oppositely extending pairs. Each pair of peeling units serves one pair of stemming tubes, mounted one in front of the other. A pair of peeling units is mounted on each of the two arms 193 and 194 of the peeling head actuating bracket 192 secured to the reciprocating peeling head actuating rod 72. The peeling units thus are reciprocated vertically by the peeling head actuating rod to perform their peeling operations. Since all of the peeling units are similar to each other, only the pair thereof associated with the two left hand stemming tubes of the left hand group of four as shown in Figs. 1 and 5 will be described in detail.

The arm 193 of the bracket 192 (Figs. 5, 17, 19, 20, 21, and 22) is bent slightly as at 371 (best illustrated in Fig. 22) so that the outer portion of the arm will enter diagonally between the front and rear spindles of the pair of stemming tubes which it serves. An axially vertical hole is provided through arm 193 slidably to receive a mounting stud 372 screwed upwardly into a threaded hole in the lower plate 60 of the suspended frame 59 and secured therein by a lock nut 373. This mounting stud 372 (Figs. 20, 21 and 22) forms the central supporting member of a peeling unit guide frame 375, the other members of which consist of an upper frame block 374, a pair of similar, but reversely mounted, upright frame members 377 and 378, of inverted L-shape, and a lower frame block 379. The upper and lower frame blocks 374 and 379 each have a hole therethrough to receive the mounting stud 372 and are secured in adjusted position thereon by set screws (Fig. 21).

The upright frame members 377 and 378 are mounted one on each of the two longer sides of the frame blocks 374 and 379. The lower end of each upright frame member is secured to the lower frame block 379 by a cap screw 380, while its upper end has a pair of notches 381 therein (Figs. 20 and 22) freely to receive the shanks of a pair of cap screws 382 to permit limited fore and aft adjustment of the upper ends of the upright frame members. A clamp plate 383, having a pair of holes therein to receive the shanks of the cap screws 382, clamps the upper end of the upright frame members in adjusted position to the upper frame block 374.

A plurality of rack teeth 386 are formed in the outer edge of each of the upright frame members 377 and 378 for rotatively moving a peeling head unit 280 during the upper part of its reciprocating travel up and down along the frame 375. Below the rack teeth 386, a flat guide plate 384 is secured to the outer edge of each of the upright frame members 377 and 378 by silver soldering. The guide plates 384 are somewhat wider than the thickness of the upright frame members on which they are mounted, and each has an upwardly extending portion 385 (Figs. 17, 20 and 21) adjacent the lowermost tooth of the rack 386 for a purpose to be explained later herein.

A pair of downwardly sloping peeling unit support arms 387 and 388 (Figs. 17 and 20), are formed integrally with the outer end of the bracket arm 193, and extend in opposite directions from its bearing support on the stud 372. An ear 389 (Figs. 17, 21 and 22) with a threaded hole therethrough is formed on the lower end of each of these downwardly sloping arms 387 and 388. A pair of peeling unit support studs 390 and 391 are screwed into these threaded holes from opposite sides of the sloping bracket arms 387 and 388 and are secured therein by lock nuts 392.

A peeling arm support cam 393 (Figs. 17, 20 and 31) is gripped in adjusted position between each of the lock nuts 392 and its associated ear 389. The cam 393 is shaped to conform to the silhouette of the butt end of a peeled pear, and is adjusted to limit the inward swinging movement of the peeling arm to prevent it from striking the rotating blades 363 of its associated stemming tube in the event no pear should be impaled on the stemming tube during a reciprocation of the peeling unit.

A peeling unit 280 (Figs. 17, 18, 19 and 31) is pivotally mounted on each of the horizontal support studs 390 and 391. Each peeling unit comprises a rocking frame 394, having an elongated transversely curved central portion 395 with integrally formed end blocks 397 and 398 pivotally mounted on each of the horizontal studs 390 and 391.

A retaining collar 400 is secured by set screws on the outer end of each of the studs 390 and 391 beyond the outer end block 398 to retain the rocking frame 394 against outward axial displacement. A laterally extending peeling arm support standard 401 is formed integrally on the outer end of each rocking frame 394, and a yoke 402 on the outer end of a peeling head support arm 403 spans the outer end of the standard and is pivotally connected thereto by a pivot pin 404. One end of the pivot pin extends axially beyond the yoke 402, and a torque spring 405 encircles the extending portion of the pivot pin. One end of the spring is hooked over a set screw 406 screwed into a hole in the yoke 402, its other end being inserted in a hole in an unthreaded spring adjusting nut 407 secured by set screws (Figs. 17 and 31) in adjusted position on the outer end of the pivot pin 404, to exert a desired inward torque on the peeling arm 403.

The peeling arm 403 extends through a slotted opening 408 in a peeling head actuating member 410 (Figs. 16 to 22, inclusive, and 29, 30 and 31) forming part of the rocking frame 394, and a peeling head 411 (Fig. 8) is mounted on the inner or free end of the peeling arm 403. The peeling head 411 is, in general, of a well known type and comprises a body portion 412 with a curved peeling blade 413 secured in adjusted position on a sloping outer end portion of the body 412 by a pair of screws 414 received in notches in the peeling blade so that its position can be adjusted to regulate the depth of peeling cut. A peeling blade guide plate 415 is adjustably mounted on the inner side of the peeling head body by a screw 417 received in a notch in the guide plate. The peeling guide plate 415 is adapted to ride on the outer surface of a pear impaled on the rotating stemming tube 360 to limit the thickness of the peeling cut in a conventional manner.

The peeling head actuating and peeling arm guide member 410 forming part of the rocking frame 394 is shown in detail in Figs. 29 and 30. This member 410 has an elongated flat body portion 418 with a round hole 419 through an end thereof (Fig. 29) to receive the horizontal peeling head mounting stud 390 or 391. The actuating member 410 is fixedly secured to the inner end block 397 of the rocking frame 394 by screws 420 for rocking movement therewith. A plate 421, having a positioning tongue 422 formed thereon is secured between the actuating member 410 and the end block 397 of the rocking frame 394, and it also comprises a substantially rigid part of the racking frame.

A flat guide surface 423 is formed along one side of a widened portion 424 of the actuating member 410, substantially parallel to the longitudinal central plane of the slotted opening 408 therein, and segmental gear teeth 425 are formed concentrically with the round hole 419 to intersect the inner end of the flat guide surface 423. An angularly disposed guide surface 427 is formed on a spur projection 428 on the other side of the actuating member 410 from the flat guide surface 423, and this angularly disposed surface 427 also intersects the teeth 425 of the gear segment.

In the normal inoperative position of the peeling mechanism C (Fig. 17), which also is its position when the peeling cut is initiated, the peeling units mounted on the sloping arm portions 387 and 388 of the bracket 192 are held by the peeling head actuating rod 72 at their upper limit of movement. In this upraised position the end tooth of the segment 425 adjacent the flat guide surface 423 is in mesh with the uppermost tooth of the rack 386, and the flat guide surface 423 rests along the edge of its associated upright frame member 377 or 378 above the rack teeth therein. In this upraised position of the peeling units, the slotted opening 408 in each peeling head actuating member 410 is substantially upright, and the peeling arm torque spring 405 urges the peeling arm 403 (Fig. 17) downwardly toward the curved peeling arm stop cam 393.

The peeling head actuating cam 190 on the main drive shaft 90 is timed to start the downward stroke of the peeling head actuating rod 72 right after a group of four pears has been lifted to impaled condition on their respective stemming tubes. As the peeling head actuating rod 72 and the bracket 192 connected thereto move downwardly, each downwardly sloping bracket arm 387 and 388 carries its peeling unit 280 pivoted on the horizontal support stud 390 or 391, downwardly with it. During the initial portion of the downward movement of the peeling units, while the peeling units are passing across and peeling the tops or butt ends of the pears, the inner conical lift rings 328 are caused to dwell in their uppermost position (Fig. 16) by their associated forked lift levers and the lift cam 135 on the main drive shaft 90. This prevents the pears from being displaced downwardly on their stemming tubes during this initial phase of the peeling operation.

The meshed engagement between each rack 386 and its segment 425 occurs while the peeling blade 413 is traversing the bulb end of the pear impaled on the stemming tube, and swings the peeling units about the mounting studs 390 or 391. This causes the curved peeling blade 413 to follow in tangential contact around the generally spherical surface of the bulb portion of the pear. As the peeling blade passes from the bulb onto the neck portion of the pear being peeled, the segment 425 rolls out of meshed engagement with the rack 386, and the tongue 422 rides onto the upwardly extending side portion 385 of the guide plate 384. This forces the angularly disposed guide surface 427 on the spur portion 428 of the peeling head actuating member 410 into sliding engagement with the outer surface of the guide plate 384 and holds it thereon during the remainder of the downward stroke.

As the peeling head at the completion of its peeling operation reaches the lower end of the neck of the pear, a cam follower roller 430 journaled on the inner end of a push rod 431 engages a cam 432 (Figs. 16, 17, 18, 19 and 21) secured by the cap screw 380 to a side of the lower end of each of the upright frame members 377 and 378. The push rod 431 is slidably mounted in a hole drilled in a plate 434 extending laterally from the rocking frame 394. The other end of the push rod 431 (Fig. 31) consists of a yoke 435 pivotally connected to the slotted free end of a short arm 437 (Figs. 17, 18 and 31). The other end of the arm 437 is secured to a pivot pin 438 which is pivotally mounted in a pair of ears 439 and 440 formed integrally with the peeling unit rocking frame 394.

A lever arm 441 is mounted between the ears 439 and 440 and is secured to the pivot pin 438. The free end of the lever arm 441 is positioned directly beneath the peeling arm 403, so that when the cam follower roller 430 on the inner end of the push rod 431 is engaged by the cam 432 as the peeling unit 280 reaches the lower end of its stroke, the free end of the lever arm 441 will be swung outwardly, engaging the inner side of the peeling arm 403 and swinging it outwardly toward the outer limit of its slot 408 in the actuating member 410 as shown in Fig. 31. This swings the peeling head 411 clear of the pear, so that the pear can then be pushed downwardly off the stemming tube without interference from the peeling head.

A butt end peeler 445 (Figs. 16, 17, 18, 19, 26, 27 and 28) is provided adjacent the upper end of each of the stemming tubes 360 to peel the central portion of the butt end of the pear inwardly of the circle at which the peeling blade 413 begins its peeling cut. The butt end peeler comprises a sharpened butt end peeling blade 447 and a transversely curved blade guide member 448. The blade 447 and guide member 448 are mounted on collars 449 and 450, respectively, secured in adjusted position near the lower end of each of the butt end peeler support rods 451 which are mounted (Fig. 19) for limited vertical slidable movement in bearings 452 and 453 secured to the sides of each of the upper and lower stemming tube spindle bearing bosses 64.

A down limit stop collar 454 (Fig. 28) is secured in adjusted position on each of the slidably mounted butt peeler support rods 451 to rest on the lower rod bearing 452 when the rod is released for movement to a gravity lowered or operative position, thereby to limit the downward movement of the rod. A spring engaging collar 455 (Figs. 5 and 19) is secured in adjusted position on an intermediate portion of each of the rods 451, and is adapted to be engaged by the upper end of a light coil spring 457 which encircles each rod 451, and whose lower end rests on the outer end of one of the arms of the butt end peeler actuating spider 196, which, as mentioned previously herein, is clamped onto the peeling head actuating rod 72 to reciprocate therewith.

A combined butt peeler support rod guide and up-limit stop member 458 (Fig. 19) is secured in adjusted position near the upper end of each of the rods 451. The rod guide and stop member 458 has a pair of laterally extending arms 459 which ride along the sides of the upper rod bearing 453 and prevent rotation of the rod, while the upper end of the member 458 is adapted to engage the lower end of the upper rod bearing 453 on a predetermined upward movement of the rod 451 to limit its upward movement by the spring 457. When the peeling head actuating rod 72 is raised to elevate the peeling units to their normal or starting position as described previously herein, the coil springs 457 are lifted by the spider 196 clamped to the peeling head actuating rod 72. The upper ends of the springs 457 when thus lifted engage the collars 455, and elevate the butt end peelers 445 clear of the pears.

As the peeling head actuating rod 72 moves downwardly during the latter part of a pear peeling operation however, the spider 196 on the actuating rod 72 lowers the coil springs 457 clear of the collars 455, and allows gravity to lower the butt end peelers 445 into peeling engagement with the butt ends of their respective rotating pears. The transversely curved guides 448 (Fig. 28) are positioned to ride on the butt ends of the pears radially outward beyond the portion thereof engaged by their butt end peeling blades, and thereby limit the amount removed by the blades 447.

During the peeling operation on each group of four pears, the carriage B associated therewith is returned to its forward or fruit receiving position. As the forward travel of the carirage moves the transfer cups 300 thereon out of register with their respective stemming tubes, the stem ejector cam 95 on the main drive shaft 90 actuates the stem ejector pins 113 by means of the connecting rod 103, yoked lever 105, and box frame 110. Each of the stem ejector pins 113 is slidably inserted in the bore of its associated stemming tube and stemming tube drive spindle (Fig. 19) and normally is maintained, by the stem ejector actuating cam 95, in raised position clear of the severed stem of the pear when it is forced into the stemming tube upon impalement of the pear. Actuation of the pins 113 by the stem ejector cam 95 however, drives the stem ejector pins 113 downwardly, through the aligned bores of the spindles and their stemming tubes until the lower ends of the stem ejector pins project below the lower ends of their stemming tubes, thereby insuring complete ejection of the stems. By ejecting the stems during the return stroke of the carirage, when the stemming tubes are out of register with the transfer cups, the stems will fall clear of the transfer cups.

Push-off foot

A pear push-off foot 460 is provided for each stemming tube for transferring the peeled pears from impaled condition on the stemming tubes to impaled condition on the splitting knives. This push-off operation is performed after the carriage has been returned to its forward position, at which time the four splitting blades 315, on the rear portion of the carriage B will be indexed directly below their respective stemming tubes.

Each push-off foot 460 comprises a hook-shaped portion 461 formed integrally with a mounting socket 462 (Figs. 23, 24, 25, 28 and 31) in which is inserted the lower end of one of the pusher actuating rods 132 described previously herein in connection with the drive mechanism. Set screws 463 secure the rods 132 in their respective sockets. Each hook-shaped portion 461 is disposed horizontally and extends partially around its associated stemming tube, the internal diameter of the hook-shaped portion being sufficiently large to clear the rotating pear turning blades 363 of the stemming tube.

The under side of the hook-shaped portion 461 is concave (Figs. 19, 24 and 28) to conform generally to the domed butt end of the pear which it engages when pushing the pear downwardly off the stemming tube to impaled condition on the splitting blade. With the carriage B in its forward position, wherein the transfer cups are indexed beneath the feed cups, and the splitting blades are indexed beneath the stemming tubes, the pear push-off members 460 are moved rapidly downward by their actuating cam 120, impaling the peeled pears along their stem blossom axes on the splitting blades as shown in Figs. 31 and 32.

As the push-off members 460 approach their lower-most limit of travel, the lower end of the sloping feed cup actuating arm 292 (Figs. 1, 2 and 5) which, as mentioned previously herein is mounted on the pusher box frame 128, strikes the bowed insert 279 of the rearmost feed cups and tilts all of the feed cups of that group to their open position, causing them to discharge their pears stem end down into the feed cups.

*Splitting blades*

The splitting blades 316 are mounted upright and in pairs, one pair being mounted in lengthwise alignment with each other on the rear portion of each leg of the U-shaped carriage frame 233. Each pair of splitting blades is mounted on a blade support frame 470 (Figs. 31, 32, 33 and 34) which may be cast with a base strip 471 integral therewith, secured along the top of one leg of the carriage frame 233 (Figs. 32, 33, 39, and 40) by cap screws 472. A pair of end members 473 and 474 extend upwardly from the base strip 471 and are connected to each other by a bar 475 which is wider than the legs at their upper ends, and is beveled upwardly to a relatively sharp upper edge (Fig. 39). Three upright splitting blade support posts 478, 479 and 480 extend upwardly from the center and ends, respectively, of the bar 475 and the pair of similar splitting blades 316 are secured by screws 481 to these posts (Fig. 33).

Each splitting blade 316 (Figs. 31, 32, 33, 35 and 39) has a vertical central oval tubular portion 482 with sharpened upper edge for performing a supplemental coring operation by reaming out any remnants of the string-like core of a pear which may be left by the stemming tube, and two side blade portions 483 and 484 with sharpened upper edges which slope downwardly slightly toward the tubular central blade portion 482. The lower end of each splitting blade consists of a pair of diverging portions 485 and 486 (Fig. 39) which fit over the beveled top bar 475 of the blade support frame 470. Screws 487 (Figs. 32 and 33) secure the diverging lower portions 485 and 486 of the blades to the top bar.

The lower end of each supplemental reaming tube blade portion 482 terminates at a central opening 488 in the splitting blade, and a core guide bead 489, having a tapered upper end thereof aligned with the tubular blade portion 482, extends downwardly from a point just below the lower end thereof and across each divided blade portion 485 and 486. These guide beads 489 ride in the grooves cut in the pear halves by the oval tubular blade portions 482, and thereby guide the halves of the split pears as they are moved downwardly across the splitting blades toward the coring stations.

A pair of cam bars 490 (Figs. 32, 33, 39 and 40) having upwardly sloping rear ends 491 are secured by screws 492 to extend lengthwise between the upright end members 473 and 474 of the splitting blade support frame 470. These cam bars control the movements of stem end gauging and trim devices to be described later herein. The forward ends of a pair of rack actuating rods 493 (Figs. 32, 33, 34, 39 and 40) for actuating a rack which rotates the calyx, seed-cell and stem end severing knives, also to be described later herein, are mounted on brackets 494 secured to opposite sides of the upright forward end member 473 of each blade support frame.

*Seed-cell, calyx and stem-end trim knives*

After feeding the fresh group of pears into the transfer cups and simultaneously pushing the group of peeled pears from the stemming tubes to impaled condition on the splitting blades, with the carriage in its forward position, the carriage again is moved rearwardly by the carriage actuating cam 220 on the main drive shaft and its associated mechanism. As the carriage moves rearwardly each splitting blade support frame 470 enters between the outwardly and downwardly sloping side portions 500 and 501 of each of a pair of coring station support members 502 (Figs. 6, 33, 34, 39 and 40). Each member 502 has cantilever support at its rear end on an integrally formed mounting bracket portion 504, secured, by cap screws 505, to the rear top member of the base frame 50.

The upper edges of the sloping plate portions 500 and 501 are thickened as at 508 (best illustrated in Fig. 39) and are adapted to underlie closely the overhanging side portions of the widened, beveled top bar 475 of the blade support frame 470 when the carriage is in its rearmost position. Since the sloping side portions 500 and 501 and their associated mechanisms are similar, but opposite, to each other, one only will be described in detail. The plate portion 500 has a pair of rectangular openings 509 and 510 (Fig. 33) therein each having a central gap 511 opening into the lower side thereof.

A beveled base bar 512 (Figs. 39 and 40) is secured along the outer side of the lower edge of each outwardly sloping plate portion 500. A sheet metal shield 514 (Figs. 39 and 40) is mounted over each beveled base bar 512, and its upper edge is shaped to clear the operative parts of the stem end severing mechanism to be described later herein. A pair of spacing strips 513 and 518 (Figs. 33 and 40) of approximately equal thickness are provided transversely across each of the rectangular openings 509 and 510 in the sloping plate portion 500.

A rotary trimming knife shaft 520 (Figs. 32, 33, 35, 36, 37, 38, 39 and 40) is journaled centrally of each of the rectangular openings 509 and 510 with its lower portion extending through the associated gap 511. The upper end of each knife shaft 520 is journaled in a hole in a boss 521 (Figs. 32, 35, 38 and 40) on the thickened upper edge portion 508 of the sloping plate portion 500. The lower end of the shaft 520 is journaled in a hole in the beveled base bar 512, and an intermediate portion thereof is journaled in a drilled boss on the transverse central spacing strip 518.

A pinion 525 (Figs. 33 and 34) is secured to the lower end of each knife shaft 520 to bear on the lower wall of an opening 527 provided therefor in the beveled base bar 512, and a rack bar 528, with its teeth intermeshed with those of each pair of the pinions 525 is slidably mounted in brackets 529 and 530 on the inner side of the beveled base bar. A rack actuating arm 531 (Figs. 34, 39 and 40), with a hole therein slidably to receive one of the rack actuating rods 493 on the splitting blade support frame 470, is mounted on each rack bar 528 near its forward end to extend upwardly therefrom. A nut 532 (Fig. 34) and locknut on the rear end of the rack actuating rod 493, and a second nut 533 and locknut on a forward threaded portion of the rod 493 are adapted alternately to engage opposite sides of the rack actuating arm 531 as the reciprocating carriage B approaches the end of each stroke of its reciprocation. Each such engagement moves the rack bar 528 slidably endwise a sufficient distance to rotate the pair of pinions 525 in meshed engagement therewith and their connected knife actuating shafts 520 through one complete revolution.

Each knife shaft 520 has a larger diameter portion 534 (Figs. 32, 38 and 39) beginning just above the central spacing strip 518 and terminating near its upper end. A side of this larger diameter portion is cut away at 535 to approximately half its diameter to provide a flat knife mounting surface along the rotative axis of the knife shaft. A combined calyx and seed cell severing trimming knife 538 is mounted on this flat surface and comprises an arcuately curved upper end portion 539 with a sharpened edge located to swing in an arc upon rotation of the shaft 520 to ream out the calyx end of a pear half. A flat intermediate portion 540 of the blade below the curved calyx trimming portion 539 is secured to the flat surface 535 of the shaft 520 by a screw, and below this flat portion a sharpened, semi-circularly curved blade portion 541 is provided to circumscribe and sever the seed cell of a pear half located to have its calyx reamed out by the upper blade portion 539. The lower end of the knife 538 is secured to the shaft 520 by a second screw 542.

For supporting the pears during the seed celling and calyx trimming operation a pair of similar, but reversed, sheet metal support plates 543 and 544 (Figs. 32 and 35) are secured over each of the rectangular openings 509 and 510 in the sloping plate portion 500 by screws 545. Each pair of support plates 543 and 544 are spaced apart to permit the knife shaft 520 to rotate freely between their adjacent edges, and are spaced outwardly (Fig. 39) from the sloping plate portion 500 by the spacing strips 513 and 518 and the thickened upper edge 508 of the sloping plate portion 500 so that they are substantially coextensive with the diverging lower portions of their respective splitting blades when the carriage is in its rearward position. Rounded notches 547 and 548 (Figs. 32, 33 and 35) are provided in the adjacent edges of each pair of support plates 543 and 544 to allow the curved blade portions 539 and 541, respectively, to swing freely therein during a complete revolution of the knife shaft 520. A pair of relatively large rectangular notches 549 and 550 also are provided in the lower inner corners of the support plates 543 and 544 on opposite sides of the knife shaft 520 to break the suction of the pear on the support blades when the cut face of a completely prepared pear half is moved slidably downward thereover. These notches also permit limited vertical reciprocation of a frame block 551 (Figs. 36, 37 and 38) having a stem end trim blade 552 and stem end gauging bracket 553 mounted thereon.

The frame block 551 has an upright drilled boss 554 formed on one end thereof, and a tubular liner 555 is mounted rotatively in the drilled boss. The stem end trimming blade 552 is secured to the upper end of the tubular liner 555 to extend laterally therefrom in a plane at right angles to the liner axis. Collars 556 and 557 are provided on the upper and lower ends, respectively, of the liner 555 to retain it against axial displacement. The tubular liner 555 has a fixed key 558 extending into its bore and this key is adapted to ride in a keyway 558' (Fig. 37) in the knife actuating shaft 520 to allow the frame block 551 and its associated parts to slide endwise along the knife shaft 520 and to rotate the tubular liner 555 and its supported stem end trim knife 552 with the shaft.

Each frame block 551 has a laterally extending arm 559 formed thereon, the outer end of which is adapted to ride (Fig. 33) in the space between the sloping frame 500 and one of the support plates 543 or 544 as the case may be on a vertical movement of the frame block to prevent rotative movement of the block. The frame block 551 (Fig. 37) has a portion 560 which extends upward slightly above the plane of rotation of the stem end trim knife 552, a notch 561 being provided in the portion 560 to allow the stem end trimming knife 552 to pass therethrough during a rotative movement of the shaft 520.

The stem end gauging bracket 553 (Fig. 37) for positioning the stem end trim knife in proper relation to the stem end of a pear supported on the plates 543 and 544 has a slotted upright portion 563 thereof flush mounted by screws 564 for limited vertical adjustment in a recess in the outer side of the frame block 551. The upper end portion 565 of the stem end gauging bracket 553 is bent outwardly at right angles to the slotted upright portion 563, and its edge is curved to conform to the curved side of the drilled boss 554 against which it is mounted.

Each frame block 551 (Figs. 33, 37, 39 and 40) has a roller 568 pivotally mounted on its inner side to ride in a slotted opening in a lever arm 569 (Fig. 33) pivotally mounted on the sloping frame portion 500 so that the frame block 551 and its associated parts will be moved vertically by a swinging movement of the lever arm. The lever arms 569 of each pair thereof are spring biased by a leaf spring 570 (Fig. 33) mounted on the sloping plate portion 500 normally to swing the free ends of the lever arms 569 upwardly. Each lever arm 569 has a cam follower roller 571 pivotally mounted on its free end on its inner side in the path of movement of the cam bars 490 (Figs. 32, 33, 39 and 40).

As the carriage B moves rearwardly between the sloping plate portions 500 and 501, the sloping rear ends 491 of the cam bars 490 force the rollers 571 downwardly, thereby swinging the lever arms 569 on which they are mounted downwardly, and lowering the frame blocks 551 and their supported stem end trim knives 552 and gauging brackets 553 (Figs. 35, 37 and 39) below the curved upper edges of the shields 514.

*Gripping mechanism*

A pair of gripper arms 580 and 581 (Figs. 1, 2, 3, 6, 7, 39 and 40) are provided for gripping each pear in its impaled position on the splitting blade as the carriage reaches its rearward limit of travel (Figs. 2 and 39), and for moving the pear downwardly across the splitting knives to split the pear and to move the pear halves downwardly to their final operating position illustrated in Fig. 40. The four pairs of gripper arms for one side of the machine are pivotally mounted in opposed pairs at their upper ends on the crosshead 218 which, as described previously herein, is secured in adjusted position on the upper end of the gripper actuating rod 205 for vertical reciprocation by the gripper actuating cam 200 on the main drive shaft 90. A pair of forwardly and rearwardly extending drilled bosses 584 (Figs. 3, 6 and 40) are provided on each arm of the crosshead to receive pivot pins 585, the ends of which extend both forwardly and rearwardly from the bosses as best shown in Figs. 3 and 6.

Since the gripper arms are all substantially alike, one pair only thereof will be described in detail. Each gripper arm has a pair of side ribs 587 and 588 (Figs. 2, 6, 7 and 40) substantially parallel to each other and connected together by integrally formed transverse web portions 589. The upper ends of the side ribs 587 and 588 of each arm are curved outwardly as at 590 (Fig. 40), one arm being pivotally mounted at its upper end on each projecting forward and rearward end of each pivot pin 585. A torsion coil spring 591 encircles the pivot pin 585 between the pivotally mounter upper ends of the side ribs 587 and 588 of each gripper arm, one end of the coil spring being inserted in a hole in the gripper arm, and the other in a hole in a collar 592 (Figs. 2 and 3) secured in adjusted position on the pivot pin by set screws.

A gripper cup 595, shaped to fit over one side of the bulb portion of a pear (Figs. 39 and 40) is pivotally mounted on a pin 596 in the lower end of each gripper arm. A light coil spring 597 is held in compression between the lower portion of each gripper cup 595 and a bracket 598 secured to the lower end of the gripper arm. The spring 597 prevents the cup from tilting down out of proper position when no pear is gripped therein. A pin 599 secured to the bracket 598 and fitted into the end of the spring 597 prevents the spring from becoming displaced. A bracket 600 is secured in adjusted position by screws 601 to the inner side of each gripper arm above the gripper cup 595 thereon to bear against the butt end of a pear half gripped in the cup to prevent it from becoming displaced during a downward stroke of the gripping mechanism.

The inner edge of one side rib 587 of each gripper arm is adapted to ride on a roller 602 mounted in a bracket 603 on the transverse gripper frame member 215 during the downward stroke of the gripper mechanism when no pear half is gripped in the cup 595. This prevents the empty gripper cups from scraping along the pear support plates 543 and 544 during such downward stroke and possibly damaging the cups or the support plates. When a pear half is in position in the gripper cup 595, however, (Figs. 39 and 40) the pear itself holds the cup out of contact with the support plates and also holds the gripper arms 580 and 581 outwardly sufficiently to clear the rollers 602.

The gripper arms of each pair thereof must be separated in their lowermost position to free completed pear halves from the gripper cups, and must also be released for closing at their uppermost position to fit over the freshly peeled pears impaled on the splitting blades. To perform these arm separating and releasing operations during an upward stroke of the gripping mechanism, while permitting the arms to remain closed during their downward stroke, a pair of pivotally mounted angularly bent cam levers 604 and 605 (Figs. 1, 6, 39 and 40) are provided for each pair of gripper arms 580 and 581. Since both cam levers 604 and 605 are similar to, but reversed from, each other, only cam lever 605 will be described in detail.

The cam lever 605 comprises an upright arm portion 607 having a cam block 608 embossed on the rear side thereof. The lower end of the cam block is tapered outwardly and upwardly to provide a sloping cam surface 609. The upper end of the cam block 608 is rounded at 610 on its outer side, and is tapered inwardly and downwardly on its inner side at 611. The inner and outer sides, 613 and 614, respectively, of the cam block portion 608 are substantially parallel to each other. An upper arm portion 615 (Fig. 40) of the cam lever 605 extends at right angles to the upright arm portion 607 thereof, and is pivotally mounted, at a point intermediately of its length, on a pin 616 secured to the stationary transverse frame member 215. A stop screw 617 (Fig. 40) is screwed upwardly through a threaded hole in the free end of the upper arm portion 615 of the cam lever 605 and is secured in adjusted position therein by a locknut 618.

As illustrated in Fig. 40, the center of gravity of the entire pivotally mounted cam lever 605 is to the left of the axis of the supporting pivot 616, and therefore gravity tends to swing the lever in a counter-clockwise direction from the position shown in Figs. 39 and 40. However, the engagement of the stop screw 617 with the under side of the transverse frame member 215 limits the swinging of the cam lever 605 in a counter-clockwise direction about its pivot beyond this adjusted position. Except for the gravitational resistance, the lever is free to swing in the opposite direction.

A cam follower roller 619 (Figs. 2 and 6) is mounted on an extending portion of the pivot pin 596 which supports the gripper cup. The cam block portion 608 of the cam lever 605 is in the path of movement of this roller during vertical reciprocation of the gripper mechanism and the roller is adapted to travel vertically just beyond the cam block portion 608 of the cam lever 605 at both the upper and lower reciprocative limits of its associated gripping mechanism (Figs. 39 and 40). As the gripping mechanism begins its upward stroke on each reciprocation thereof, the cam follower rollers 619 will ride outwardly on the sloping lower ends 609 of the cam blocks 608, thereby separating the lower ends of each pair of gripper arms against the torsion of their coil springs 591, and moving the gripper cups apart, clear of the completed pear halves which they will have retained in position in their trimming stations up to this stage in the operation of the machine. The cam follower rollers 619 ride upwardly along the flat outer surfaces 614 of the cam blocks 608 and then inwardly over the rounded upper ends of the cam blocks. As the rollers 619 clear the upper ends of the cam blocks 608, the torsion coil springs 591 swing the gripper arms of each pair thereof toward each other, closing the gripper cups (Fig. 39) over the bulb end of a freshly peeled pear impaled on the splitting blade.

A rubber bumper 620 (Figs. 39 and 40) is provided on the inner side of each gripper arm, and is adapted to strike a bumper block 621 formed to extend from the transverse frame member 215. The bumpers 620 absorb the energy of the inwardly swinging gripper arms, arresting them in position over the bulb end of the pear as shown in Fig. 39 and thereby avoid the possibility of having the gripper cups crush or damage the pear. As the gripper arms 580 and 581 move downward with the crosshead 218 under the action of the gripper cam 200 on the main drive shaft 90, the cam follower rollers 619 on the lower ends of the gripper arms ride along the cam surfaces 611 and 613 of the cam blocks 608, swinging the cam levers 604 and 605 outwardly about their pivots to the dotted line positions of Fig. 39. As the cam follower rollers 619 clear the cam blocks 608 at the lower end of the downward stroke of the gripper mechanism, gravity swings the cam levers 604 and 605 back to their normal solid line positions of Figs. 39 and 40, ready again to separate the gripper arms on the next upward stroke of the gripping mechanism.

The pears are split in half along their stem blossom axes and a supplemental coring operation is performed on both pear halves by the supplemental coring tube 482 as the pears are moved downward across the splitting blades, and the halves of each pear are separated by the diverging lower portions 485 and 486 of the splitting blade. Thence the pear halves continue their downward movement onto the outwardly sloping, co-extensive pear supporting plates 543 and 544 (Fig. 40). The groove formed lengthwise in each pear half by the oval tubular central blade portion 482 rides along the guide bead 489 onto the aligned knife shaft 520 to center the pear half thereon.

In their lowermost position the gripper arms position the pear halves with their calyxes and seed cells over the openings in the support plates formed by the complementary notches 547 and 548 therein, and opposite the respective blade portions 539 and 541 of the calyx and seed cell severing knife 538. The calyxes, seed cells and stem ends of the pear halves are severed and removed, and the completely prepared pears are discharged from the machine in a manner to be described later herein.

*Operation*

The operations of the various mechanisms on the left-hand side of the machine as illustrated in Fig. 1 will be described briefly in sequence as they occur during the preparation of one group of four pears. The operation of the corresponding mechanisms on the other side of the machine during the preparation of the four pears of a second group, as mentioned previously herein, will occur concurrently but out of phase with that of the mechanisms now to be described.

A diagrammatic illustration of the sequence of operations is to be found in Figs. 41, 42, 43, and 44. It will be noted that it requires two complete reciprocations of the carriage B to complete the preparation of a pear from the time the unpeeled pear is fed, stem end down, by its feed cup into a transfer cup indexed therewith, until it is completely peeled, cored, halved and trimmed. However, the completed pear halves are not ejected from the machine at the end of this four stroke cycle of the carriage, but remain gripped in their terminal position until the carriage B moves rearwardly on the first stroke of its next cycle, and the gripping mechanism is operated to grip and carry a freshly peeled group of pears down onto the trimming stations on the support plates 543 and 544. This action forces the previously completed pear halves downwardly off the support plates 543 and 544, and over the shield 514, whence they drop onto a chute or conveyor of a conventional type, not shown, for removal from the machine.

Since after the first complete reciprocation of the carriage there are always two groups of pears in process on each side of the machine, plus those that are retained in their terminal position until the next actuation of the gripping mechanism, one group of four pears will be completed on each complete reciprocation of each carriage, and each group of completed pears will be discharged on each subsequent downward stroke of the gripper arms associated therewith.

In the diagrammatic views, Figs. 41 to 44, inclusive, a group of pears are illustrated in heavy solid lines in successive stages of processing during the two strokes of an initial complete reciprocation of the carriage, which are the first two strokes of the four stroke cycle of the machine, while in lighter solid lines in these same four views the pears are illustrated in successive stages of processing during the second or final two strokes of the carriage during such cycle. The pears illustrated in dotted lines in one or more of these same four views are those from preceding or succeeding cycles, other than the four strokes or two complete reciprocations of the carriage comprising the one complete cycle thus illustrated.

For the present description, it will be assumed that the machine is just being started and that no pears are in process in the machine. With the drive motor 94 energized, the main drive shaft 90 with the various cams thereon will be rotated continuously by the speed reducing drive pinion 93 and driven gear 92 (Figs. 1, 3 and 4). The stemming tubes 360 also will be rotated continuously by the sprockets 234 and drive chain 235 driven from the vertical shaft 241 by the train of gears including the bevel gears 244 and 245.

With the machine running the operator places four pears stem end down in the four feed cups 260, 261, 262 and 263 of the feed mechanism A on the left hand side of the machine as shown in Figs. 1 and 3. As the carriage B reaches the forward limit of its travel (Fig. 41) ready to begin the first rearward stroke of its four stroke cycle the four transfer cups 315 will be indexed beneath their respective feed cups. The forwardly and downwardly sloping feed cup actuating arm 292 mounted on the pusher actuating box frame 128 then is moved downwardly by the action of the pusher actuating cam 120, and the lower end of the feed cup actuating arm 292 strikes the forwardly bowed insert 279 in the rearmost feed cup support shaft (Fig. 42) and, by means of the interconnecting levers 281, 282, 287, and 288, and link 284 (Figs. 3 and 5) tilts all four feed cups of the group to their open position.

This discharges the pears through the feed cups stem end down into the transfer cups 315, after which the feed cups again close promptly under the action of the counterweight 289, since the pusher box frame 128 does not dwell at the bottom of its stroke, but returns at once to its normal raised position (Fig. 5). With the carriage B in its forward position, the transfer cups 315 are held open by the rollers 353 (Fig. 13), riding on the cam tracks 354, thereby allowing the smaller stem end of each pear dropped stem end first therein to center itself by gravity in the conical concentric rings 328 and 329 (Fig. 15).

With the pears in the transfer cups 315, the carriage B then is moved rearwardly (Fig. 42) by its actuating cam 220 (Fig. 11) on the main drive shaft and associated mechanism including the offset carriage actuating lever 225. As the carriage B moves rearwardly the cam follower rollers 353 ride off the rearward ends of their horizontal cam tracks 354, allowing the torsion coil springs 349 (Fig. 14) to swing the bulb centering arms 333 and 334 toward each other, thereby closing the angularly bent plate portions 335 on the upper ends of the arms 333 and 334 about the bulb end of the pear in the transfer cup. This centers the bulb end of each pear in its transfer cup, and brings the stem-blossom axis of the pear into vertical alignment with its previously centered stem end.

As the carriage B approaches its rearmost position, the rollers 164 (Figs. 11 and 13) on the lower ends of the pear lift rods 169 of the carriage enter their respective notches in the forked forward ends 163 of their respective lift levers 158, 159, 160 and 161. As the carriage B arrives at its rearward limit of travel (Figs. 11 and 43) the rear buffer springs 308 (Fig. 11) are engaged by the brackets 313 on the carriage, and are compressed to urge the carriage forwardly, thereby taking up any slack in the operating connections between the carriage and its actuating cam.

As soon as the carriage B has come to rest in its rearmost position of Fig. 43, with the upright stem blossom axes of the pears in the transfer cups indexed beneath their respective stemming tubes, the lift levers 158, 159, 160 and 161 (Figs. 2, 4, 9 and 11) are swung upwardly by the pear lift actuating cam 135 (Fig. 9) and its associated mechanism. This action elevates all four of the lift rods 169 and their small conical central lift or thrust rings 328 (Figs. 15, 16 and 44) in which the stem ends of the pears in the transfer cups are centered, and impales the pears along their stem blossom axes on their respective rotating stemming tubes 360 indexed therewith.

During this impaling action the sharpened lower edge of the stemming tube severs the cylindrical stem blossom axial core portion of each pear (Fig. 16) the severed stem portion being forced into the stemming tube by the upward movement of the pear. During this stage of operation the core ejector pins 113 (Fig. 19) are maintained at a sufficient height within their respective stemming tubes to permit the severed stem portions to enter the stemming tubes as shown in Fig. 16. Also at this same stage of operation, the peeling units 280 (Figs. 16 and 19), the butt end peelers 445, and the hook-shaped pear pushers 460 are all held in their raised positions by their respective actuating cams. Thus the pears are free to be moved to fully impaled position on their stemming tubes without interference. As the pears are lifted toward fully impaled condition on their stemming tubes 360, the helically curved radial blades 363 (Fig. 28) near the upper ends of the stemming tubes penetrate the butt ends of the pears and cause the pears to rotate co-axially with the rotating stemming tubes upon which they are impaled.

As the rotating pears reach their upper limit of movement the upper or butt end of each pear is lifted into contact with the blade 413 of its respective peeling head 411 (Figs. 8 and 16). The peeling unit 280 thereupon begins its downward travel under the action of the peeling head actuating rod 72 and cam 190. In order to simplify the diagrammatic showing of Figs. 41 to 44, inclusive, the peeling mechanism, including the butt end peelers 445, is omitted. The operation of the peeling mechanism is, however, illustrated in Figs. 16, 17, 18 and 31.

As the peeling head actuating rod 72 begins its downward travel under the action of the peeling head actuating cam, the bracket 192, secured to the peeling head actuating rod 72 carries the peeling units 280, pivoted on the studs 390 and 391 in the ears 389 on the lower ends of the outwardly and downwardly sloping peeling unit support arms 387 and 388 (Fig. 20), downwardly with it. As each peeling unit thus begins its downward travel along the vertical guide frame 375, each gear segment portion 425 of the peeling head rocking frame actuating member 410, being in meshed engagement with the stationary rack 386 on the upright frame member 377 or 378 as the case may be (Fig. 16), swings the peeling head rocking support frame 394 of which it forms a part about the downwardly moving peeling unit support stud 390 or 391 as a pivot. This rocking movement of the support frame 394 causes the curved peeling blade 413 to follow around the generally spherical contour of the bulb end of the pear to peel it.

During the initial portion of the peeling stroke, when the peeling head 411 is swinging outward over the butt end of the pear, the lift cam 135 causes the small conical central lift ring 328 (Fig. 16) of the transfer cup to dwell in its raised position, thereby to support the pear and prevent its downward displacement on the stemming tube. After the peeling head has swung around toward the side of the bulb end of the pear, however, so that it no longer exerts any considerably downward force on the pear, the lift cam lowers the lift ring 328, and the carriage then is returned to its forward position to be ready for another pear feeding operation.

The cores or stems punched out of the pears and forced into the stemming tubes during the impaling of the pears, are ejected from the stemming tubes during the forward travel of the carriage (between the stages illustrated in Figs. 44 and 41) by a rapid downward movement of the ejector pins 113 (Fig. 19) caused by the ejector cam 95 (Figs. 1 and 2) on the main drive shaft. The stems are ejected as the transfer cups are moved forwardly out of register with their stemming tubes so that they will fall free and not into the transfer cups.

The bulb peeling portion of the peeling operation is completed as the segmental gear teeth 425 roll clear of the lowermost of the rack teeth 386, and the angularly disposed surface 427 on the peeling head actuating member 410 rides onto the flat guide plate 384 soldered along the edge of the upright frame member. At this stage of operation, the tongue 422 on the rocking peeling head support frame 394 rides onto the upwardly extending side portion 385 of the guide plate 384 to prevent counter rotative movement of the peeling head actuating member 410. The peeling blade 413 is curved to fit into the curvature joining the bulb and neck portions of the pear, and peels this portion of the pear as the blade is moved downwardly onto the neck of the pear.

As the peeling head 411 approaches the lower end of the neck of the pear, the downward movement of the peeling head actuating rod 72 lowers the butt peeler spring support spider 196 clamped thereto to a position where the butt peeler support springs 457 clear the collars 455 and allow gravity to lower the butt end peeler blades 447 into contact with the butt ends of their respective pears, and to peel them inwardly of the starting circles of the peeling blades.

As each peeling head 411 reaches the lower end of the neck of its pear (Fig. 31) the push rod roller 430 rides onto the cam block 432, on the lower end of the upright guide frame members, 377 or 378 as the case may be, swinging the lever 441 outwardly and forcing the peeling arm 403 outwardly in its slot 408 (Fig. 31) against the torsion of its spring 405 to clear the bulb end of the pear when it is pushed off of the stemming tube. By the time the peeling arms 403 are thus swung outwardly to clear the pear for removal from the stemming tubes, the carriage B will have returned to its forward position (Fig. 41) to again index the transfer cups beneath their respective feed cups, for the beginning of the second complete reciprocation of the carriage. In this extreme forward position of the carriage the splitting blades 316 also will be indexed beneath their respective stemming tubes.

With the peeling heads 411 swung outwardly to clear the pears, the hook-shaped pushers 460 (Fig. 42) are moved downward quite rapidly by the action of the pusher actuating cam 120 on the main drive shaft 90 and associated mechanism including the box frame 128 slidably mounted on the peeling head actuating rod 72. The downward movement of the pushers 460 pushes the pears off the stemming tubes and impales them on their respective splitting blades as shown in Figs. 32 and 42. At the lower end of the stroke of the pusher actuating box frame 128, the lower end of the forwardly and downwardly extending feed cup actuating arm 292 mounted on the box frame 128 again opens the feed cups, which have been filled meanwhile by the operator, and the transferring, impaling on stemming tubes, peeling and pushing steps just described are repeated with the new group of pears thus dropped into the transfer cups.

Continuing now with a description of the further processing of the pears which occurs during the second half of the four stroke cycle of the machine, as illustrated by the pears shown in lighter lines in Figs. 41 to 44, inclusive, as the four peeled pears are pushed from their stemming tubes to impaled position on the splitting blades 316 (Fig. 42), and clear of their stemming tubes 360, the carriage B again moves rearward (Fig. 43) to carry the splitting blade support frames 470 between the sloping plate portions 500 and 501. As the carriage reaches its rearmost position (Fig. 43) the pears impaled on the splitting blades will be indexed directly above their respective trimming stations E.

During the rearward travel of the carriage, the sloping rear ends of the cam bars 490 on the sides of the blade support frame 470 engage the lever mounted rollers 571 to lower the frame blocks 551 and their stem end trim knives 552 to a position where the stem end gauging bracket 553 will be below the neck end of the longest pear which ordinarily will be processed. The frame blocks 551 are retained in this lowered position by the cam bars 490 as long as the carriage remains in its rearward position.

Approximately at the same time that the small conical lift rings 328 start their upward travel to lift the unpeeled pears of the succeeding group then in the transfer cups and impale them on the stemming tubes, the gripper arms 580 and 581 are moved upwardly (Fig. 44) by their actuating cam 200 on the main drive shaft 90 and associated mechanism to grip the freshly peeled pears impaled on the splitting blades and draw them down onto the coring stations. During the upward travel of the gripping mechanism, the cam follower rollers 619 (Figs. 6 and 39) on the lower ends of the gripper arms, ride upwardly on the sloping lower ends 609 and along the outer surfaces 614 of the cam blocks 608 (Fig. 6).

Since the cam levers 604 and 605 are held in adjusted position by their stop screws 617 against inward pivotal movement, this action by the cam follower rollers 619 swings the gripper arms of each pair thereof apart. This separates the gripper cups 595 to free the completed pear halves of the preceding group thereof (Fig. 44). These completed pear halves usually will remain on the plates 543 and 544 in approximately the position in which they are released by the gripper cups until the gripper arms again return to their lowermost position with the next group of freshly split pears.

As the gripper arms 580 and 581, held separated by the rollers 619 riding on the cam blocks 608, are raised to a height which carries the rollers 619 above and beyond the cam blocks, the gripper cups 595 are located directly opposite the bulb ends of the freshly peeled pears impaled on the splitting blades. The gripper arms 580 and 581 of each pair thereof, under the torsion of their springs 591 are then swung toward each other (Fig. 39) to close the gripper cups over the bulb ends of the pears impaled on the splitting blades. The rubber bumpers 620 striking the bumper block 621 absorb the arm arresting impact and prevent injury to the pears.

The gripper arms 580 and 581 then are moved downward by the action of the gripper actuating cam 290, severing the pears into halves on the splitting blades. The oval tubular central portions 482 of the splitting blades ream out any remnants of the stringy stem portions of the pears which may remain, and insure that the axial groove in each pear half is properly aligned with the guide bead 489 and the knife actuating shaft 520 (Figs. 40 and 44) as the gripper arms carry the pear halves downwardly. The brackets 600 resting on the butt ends of the pears during the downward movement of the gripper arms force the pear halves over the complementary notched openings 547 and 548 in the supporting plates 543 and 544, bringing the pear halves to rest with the calyx cavity and seed cell of each located opposite the corresponding portions 539 and 541 of the calyx and seed cell severing knife 538.

Here the gripper arms 580 and 581 dwell while the carriage again travels forward to return to its starting position illustrated in Fig. 41, thereby to complete the fourth and final stroke of its four stroke cycle. During this final forward stroke of the carriage, as the beveled rear ends 491 of the cam bars 490 clear the lever mounted rollers 571, the frame blocks 551 are permitted to move upwardly under the impulse of their respective leaf springs 570 to raise the gauging brackets 553 into contact with the lower or stem ends of the pear halves (Fig. 38), thereby positioning the frame block 551 so that the plane of rotation of the stem end trim blade 552 is the required distance above the stem end of the pear half. As the carriage approaches its forward limit of travel, the rack actuating arms 531 are engaged by the rearward nuts 532 (Fig. 34) on the horizontal rack actuating rods 493, and, by means of the sliding rack bars 528 and pinions 525, swing the knife actuating shafts 520 through one complete revolution. This severs the calyx and seed cell and trims off the stem end of each pear half.

Although this common rotative movement of all four of the knife shafts on the carriage actually completes the preparation of the pear halves, they are retained by their respective gripper arms on their respective trimming stations in register with their calyx and seed cell severing blade portions. As the carriage again moves rearward on the first stroke of the next cycle, the cam bars 490 again ride onto the lever mounted rollers 571, lowering the frame blocks 551 and their stem end trim knives 552 from the position shown in Fig. 40. As the carriage again approaches its rearward limit of travel, the rack actuating arms 531 are struck by the forward nuts 533 on the horizontal rack actuating rods 493, thereby slidably moving the racks and swinging the knife shafts 520 through one complete revolution in a reverse direction from that taken during the forward stroke of the carriage. This reverse rotation of the knife shafts sweeps out the calyx and seed cell cavities and restores the knife shafts to their starting position. Since the stem end trim knives 552 are lowered by their supporting frame blocks 551 below the lower end of the trimmed pear halves before this reverse rotation occurs, the stem end trim knives at most merely sweep aside the severed stem ends of the pears during their return to starting position.

The completed pear halves remain on the support plates 543 and 544 until the next succeeding vertical reciprocation of the gripper arms (Figs. 44 and 41) which occurs shortly after the carriage has returned to its rearmost position. When a freshly split group of pears is moved downwardly onto the trimming stations, the previously completed pear halves are pushed downward over the sloping shields 514 and thence drop into conventional discharge chutes, not shown, or other conveyors or receptacles as desired.

While I have illustrated and described a preferred embodiment of the present invention, it will be understood however that various changes and modifications may be made in the details thereof without departing from the spirit and scope of the invention as set forth in the appended claims.

Having thus described the invention, what I claim as new and desire to protect by Letters Patent is as follows:

1. In a fruit preparation machine having a fruit processing mechanism therein, a carriage mounted to reciprocate transversely of said processing mechanism, a transfer cup mounted on said carriage, a first conical pear centering ring mounted in said transfer cup and adapted to center the stem end of a pear therein, a second conical pear centering ring mounted coaxially with said first pear centering ring and with its inner wall normally co-extensive with that of said first pear centering ring, and means mounted to elevate one of said pear centering rings in a predetermined position of carriage movement to lift a pear centered on said rings toward the processing mechanism.

2. In a fruit preparation machine having a fruit processing mechanism therein, timed means mounted to actuate said processing mechanism, a carriage mounted to reciprocate transversely beneath said processing mechanism, a transfer cup mounted on said carriage to be indexed with said processing mechanism in one limit of carriage reciprocation, a first conical pear centering ring mounted in said transfer cup and adapted to center the stem end of a pear therein, a second conical pear centering ring mounted coaxially with said first ring and with its inner wall normally extending in conical prolongation with that of the first ring, means mounted adjacent said centering rings to align the stem blossom axis of a pear having its stem end centered in said rings, and actuating means mounted to elevate one of said pear centering rings with the carriage in said one limit of reciprocation to lift a pear centered on said rings along its stem blossom axis toward the processing mechanism, the latter actuating means being adapted to dwell with the ring so elevated during a portion of the actuation of the processing mechanism.

3. In a fruit preparation machine an upright splitting blade mounted for reciprocation between predetermined limits, means for impaling a pear along its stem blossom axis on said splitting blade in one limit of its reciprocative movement, a pair of sloping support plates mounted to receive the splitting blade between them at its other limit of reciprocative movement, the lower edges of said support plates being spaced apart, and the upper edges thereof converging toward said blade to be substantially co-extensive therewith in its said other limit of reciprocative movement, a trimming station in each sloping plate, a trimming knife rotatively mounted in each of said stations, a pinion connected to each trimming knife, means mounted to grip a pear impaled on the splitting blade to draw it toward the trimming stations, thereby splitting the pear in half and positioning the pear halves over their respective trimming stations, a rack slidably mounted between spaced apart portions of said sloping plates, said rack being in meshed engagement with said pinions, and means operatively engaging said rack at a predetermined stage in the reciprocative movement of said blade, rotatively to move the trimming knives to sever portions of said pear halves.

4. In a fruit preparation machine a splitting blade mounted for reciprocation between predetermined limits, means for impaling a peeled pear along its stem blossom axis on said splitting blade at one limit of reciprocative movement of said blade, a pair of support plates mounted to receive the splitting blade between them at its other limit of reciprocative movement to be substantially coextensive therewith, a trimming station in each support plate, a trimming knife rotatively mounted in each of said stations, gripping means mounted to split a pear impaled on the splitting blade in half and to position the pear halves over their respective trimming stations, and drive means mounted rotatively to move the trimming knives with the pear halves so positioned.

5. In a fruit preparation machine, a frame, a trimming station operatively mounted upon said frame, means mounted to move a pear half to adjusted position on said trimming station, a knife shaft rotatively mounted in said trimming station, an end trimming knife slidably mounted on said shaft to rotate therewith, gauging means adapted to be engaged by a pear half moved onto said trimming station slidably to move said trimming knife to gauged position relatively to an end of said pear, and drive means mounted rotatively to move said shaft and said knife with the pear half in said adjusted position to sever an end portion of said pear.

6. In a fruit preparation machine, a frame, a trimming station operatively mounted upon said frame, means mounted to move a pear half to adjusted position on said trimming station, a knife shaft rotatably mounted in said trimming station, a knife support block slidably mounted on said shaft, a tubular sleeve rotatably mounted in said block and having slidable driven connection with said shaft, a trimming knife mounted on said sleeve to rotate therewith, gauging means adapted to be engaged by a pear half moved onto said trimming station slidably to position said trimming knife in gauged position relatively to an end of said pear, and drive means mounted rotatively to move said shaft and said knife with the pear half in said adjusted position to sever a predetermined end portion of said pear.

7. In a fruit preparation machine, a frame, a trimming station operatively mounted upon said frame, means mounted to move a pear half having the stem portion thereof reamed out to adjusted position on said trimming station, a knife shaft rotatably mounted in said trimming station and adapted to center the reamed out stem portion of the pear half thereon, a knife support block slidably mounted on said shaft, a tubular sleeve rotatably mounted in said block and having slidable driven connection with said shaft, a trimming knife mounted on said sleeve to rotate therewith, gauging means mounted to move said block and said trimming knife to gauged position relatively to an end of said pear, and drive means mounted rotatively to move said shaft and said knife with the pear half in said adjusted position to sever a predetermined end portion of said pear.

8. In a fruit preparation machine, a frame, a trimming station operatively mounted upon said frame, means mounted to move a pear half stem end first to adjusted position on said trimming station, a knife shaft rotatably mounted in said trimming station, a seed cell severing blade mounted on said knife shaft to rotate therewith, an end trimming knife also mounted to rotate with said shaft and slidable lengthwise thereof, spring means mounted to bias said slidable end trimming knife toward the stem end of a pear half moved onto said trimming station, gauging means adapted to engage the stem end of a pear half on said trimming station to position said trimming knife in adjusted position relatively to said pear half, and drive means mounted rotatively to move said shaft and the knives mounted thereon with the pear half in such adjusted position to sever predetermined portions of said pear.

9. In a fruit preparation machine, a frame, a trimming station operatively mounted upon said frame, means mounted to move a pear half to adjusted position on said trimming station, a knife shaft rotatably mounted in said trimming station, an end trimming knife mounted to rotate with said shaft and slidable lengthwise thereof, spring means mounted to bias said slidable end trimming knife toward the stem end of a pear half moved onto said trimming station, cam means actuated to move the end trimming knife beyond the end of a pear in adjusted position on said trimming station, gauging means adapted to be engaged by the stem end of a pear half on said trimming station on release of said cam actuated means, and drive means mounted rotatively to move said knife with the pear half in such adjusted position to sever a gauged end portion of said pear.

10. In a fruit preparation machine, a stemming tube mounted to rotate in place, means for impaling fruit on said stemming tube for rotation therewith, a seed celling station mounted in spaced relation to and at a lower elevation than said stemming tube, a carriage mounted to reciprocate between said stemming tube and said seed celling station, a splitting blade mounted upon said carriage at an elevation intermediate said stemming tube and said seed celling station, said splitting blade being adapted to register with said stemming tube at one limit of carriage reciprocation to receive fruit in axially impaled condition thereon from said stemming tube and to alternately register with said seed celling station at the other limit of carriage reciprocation, and means mounted adjacent said seed celling station for gripping the fruit impaled on said splitting blade to draw the fruit downwardly over the blade onto said seed celling station to thereby split the fruit into halves.

11. A fruit preparation machine comprising a carriage mounted to reciprocate between predetermined limits, a fruit splitting and transferring blade mounted upon said carriage for movement therewith, a stemming tube mounted to rotate in place above the path of movement of said carriage and adapted to receive fruit for impalement thereon, a fruit trimming station mounted to operate in place below the path of movement of said fruit splitting and transferring blade and in offset relation to said stemming tube, fruit trimming means mounted in said station, timed actuating means mounted to reciprocate said carriage to alternately register said splitting and transferring blade with said stemming tube and said trimming station, timed actuating means mounted to move the fruit axially off said stemming tube to impaled condition on said splitting and transferring blade when said tube and blade are in registration, means mounted and operating in timed relation upon registration of said splitting blade with said trimming station to move the fruit impaled upon said blade across the same to split it into halves and to position each half adjacent the trimming means of said trimming station, and actuating means mounted to operate said trimming means with the fruit halves thus positioned.

12. In a fruit preparation machine, the combination comprising: a stemming tube mounted to rotate in place, a carriage mounted to move in a plane transversely of said stemming tube, a substantially frusto-conical stem end centering member on said carriage, an axially movable fruit supporting thrust member associated with said stem end centering member for receiving and supporting fruit therein, means for moving said carriage to register said centering member and its associated thrust member with said stemming tube, and timed actuating means for said thrust member to axially move same relatively to and through its frusto-conical stem end centering member to impale the fruit on said stemming tube.

13. In a fruit preparation machine comprising a fruit processing mechanism, a carriage mounted to reciprocate transversely of said mechanism, a transfer cup adapted to receive and support fruit therein and having a base mounted upon said carriage, a lift rod mounted in said base for axial movement therein, an inverted truncated conical centering ring carried by said base, bulb centering means mounted adjacent said transfer cup, a conical pear lift ring supported by said lift rod co-axially with said centering ring and with its inner face normally aligned with that of the centering ring, means mounted to index the fruit in the transfer cup with the fruit processing mechanism in a predetermined position of said carriage, lift rod actuating means adapted operatively to engage said lift rod in said predetermined position of said carriage, and actuating means operatively connected to said lift rod actuating means to elevate said lift rod and the lift ring mounted thereon to elevate the fruit so indexed with said fruit processing mechanism.

14. In a fruit preparation machine comprising a stemming tube mounted to rotate in place, means for rotating said stemming tube, means for impaling a pear along its stem blossom axis on said stemming tube for rotation therewith, peeling mechanism including guide means mounted adjacent said stemming tube, a toothed rack mounted adjacent said guide means, a peeling unit mounted to extend from said guide means, means for reciprocating said peeling unit along said guide means, said peeling unit including a rocking frame, a peeling arm pivoted on said rocking frame, a gear segment on said rocking frame in meshed engagement with said toothed rack to rock the peeling unit during a predetermined portion of a reciprocative stroke thereof, said rocking frame having a pair of angularly diverging surfaces formed thereon on opposite sides of said gear segment, each of said diverging surfaces being adapted to engage said guide means endwise beyond the rack therein to limit the rocking movement of said peeling unit, a thrust lever mounted adjacent said peeling arm and adapted to swing said peeling arm away from said rocking frame on a predetermined movement of said thrust lever, and cam actuated means mounted to actuate said thrust lever near the end of a predetermined stroke of said peeling unit to move the peeling arm outwardly to clear a pear for axial removal from said stemming tube.

15. In a fruit preparation machine comprising a stemming tube mounted for rotation in place, means for rotating said stemming tube, means for impaling a pear along its stem blossom axis on said stemming tube for rotation therewith, a peeling unit actuating member mounted adjacent said stemming tube for reciprocative movement in axially parallel relation thereto, means for reciprocating said peeling unit actuating member, a toothed rack mounted adjacent said actuating member, a peeling unit comprising a frame mounted to extend from said actuating member for reciprocation therewith and for rocking movement thereon, a gear segment on said peeling unit in toothed engagement with said rack during a predetermined portion of a reciprocative stroke of said actuating member, stop means mounted to limit the rocking movement of said peeling unit, a peeling arm pivotally mounted on said peeling unit frame, a peeling head carried on the free end of said peeling arm and adapted to have peeling engagement with a pear on said stemming tube, and a thrust element mounted adjacent said peeling arm and adapted to swing said peeling arm outwardly relatively to said peeling unit frame near the end of a predetermined stroke of said peeling unit to clear a pear for axial removal from said stemming tube.

16. In a fruit preparation machine, a fruit splitting blade mounted for reciprocation between predetermined limits, means mounted to impale a partially processed pear along its stem blossom axis on said splitting blade at one limit of reciprocative movement thereof, a trimming station mounted below the path of reciprocative movement of said blade and adapted to register therewith at the other limit of reciprocative movement of the same, a rotary trimming knife mounted in said trimming station, a pair of gripping members mounted to move along opposite sides of said splitting blade when it is in registration with said trimming station, actuating means mounted to move said gripping members to grip the partially processed pear impaled on said splitting blade and to move the gripping members and said pear gripped therebetween along said splitting blade to sever said pear in halves and to position said halves opposite said trimming knife, and drive means mounted to rotate said knife with the pear halves thus positioned.

17. In a fruit preparation machine, a fruit splitting blade mounted for reciprocation between predetermined limits, said blade having a sharpened edge at one end thereof and outwardly divergent portions at the opposite end of same, means mounted to impale a partially processed pear along its stem blossom axis on said sharpened edge of said splitting blade at one limit of its reciprocative movement, a trimming station mounted to register with said splitting blade at the other limit of its reciprocative movement, said trimming station having pear supporting surfaces adapted to extend in prolongation of said divergent portions of said splitting blade when said blade and trimming station are in registration, trimming knives mounted in said trimming station, means mounted to move the partially processed pear impaled on said splitting blade along said blade to sever said pear in halves and to move said halves over the outwardly divergent portions of said blade onto said pear supporting surfaces of said trimming station whereby predetermined portions of said pear halves are positioned opposite said trimming knives, and actuating means mounted to operate said trimming knives to trim said pear halves.

18. In a fruit preparation machine, a fruit splitting blade mounted for reciprocation between predetermined limits, said blade having a sharpened edge at one end thereof and outwardly divergent marginal portions at the opposite end of same, means mounted to impale a partially processed pear along its stem blossom axis upon said sharpened edge of said splitting blade at one limit of its reciprocative movement, a support member mounted substantially adjacent the other limit of reciprocative movement of said splitting blade, said support member having pear supporting surfaces mounted thereon adapted to extend in prolongation of said marginal portions of said splitting blade when said blade is in its last mentioned limit of reciprocative movement, a trimming station mounted upon said support member in substantially symmetrical relation to said pear supporting surfaces, a pair of gripping members mounted for disposition upon opposite sides of said splitting blade when the same is in registration with said trimming station, and timed actuating means mounted to move said gripping members to grip the partially processed pear impaled upon said splitting blade and to move the gripping members and said pear gripped therebetween along said splitting blade to sever said pear in halves and to move said halves over the outwardly divergent portions of said splitting blade onto said pear supporting surfaces of said support member to thus position predetermined portions of said pear halves over said trimming station.

19. In a fruit preparation machine, a fruit splitting blade mounted for reciprocative movement between predetermined limits, means mounted to impale a partially processed pear along its stem blossom axis upon said splitting blade at one limit of reciprocative movement of the same, a gripper supporting crosshead mounted to reciprocate at a point substantially adjacent the other limit of reciprocative movement of said splitting blade, a pair of gripper arms mounted upon said crosshead, a pear gripper cup mounted upon each of said gripper arms and adapted to fit over the sides of said partially processed pear impaled upon said splitting blade when the latter is brought into registration therewith at said other limit of reciprocative movement of same, a pair of calyx and seed cell severing stations mounted in the transverse plane of said gripper arms and in symmetrical spaced relation with respect to the plane of reciprocative movement of said splitting blade for disposition upon opposite sides of said blade when the latter is brought into registration with said severing stations at said other limit of reciprocative movement of same, a calyx and seed cell severing knife mounted in each of said stations, cam means mounted to separate said gripper arms to position the cups thereof over the sides of said partially processed pear impaled on said splitting blade, power drive means mounted to actuate said crosshead to move said gripper arms along said splitting blade, thereby splitting said pear in halves and moving the pear halves onto their respective calyx and seed celling stations with their calyx and seed cells positioned opposite their respective severing knives, and actuating means mounted to operate said knives to sever the calyx and seed cell portion from each of said pear halves.

20. In a fruit preparation machine, a fruit splitting blade mounted for reciprocation within predetermined limits, means mounted to impale a partially processed pear along its stem blossom axis upon said splitting blade at one limit of reciprocative movement of the same, a crosshead mounted to reciprocate in a path substantially perpendicular to the path of reciprocative movement of said splitting blade and at a point substantially adjacent the other limit of said reciprocative movement, a pair of gripper arms mounted upon said crosshead, pear gripping cups mounted upon said gripper arms and adapted to fit over opposite sides of said partially processed pear impaled upon said splitting blade when the latter is brought into registration therewith at said other limit of reciprocative movement of same, a pair of trimming stations mounted in the transverse plane of said gripper arms and in symmetrical spaced relation with respect to the plane of reciprocative movement of said splitting blade for disposition upon opposite sides of said blade when the latter is brought into registration with said trimming stations at said other limit of reciprocative movement of the blade, a trimming knife rotatively mounted in each of said trimming stations, cam means mounted to position the gripper cups over opposite sides of said partially processed pear impaled upon said splitting blade, drive means mounted to operate said crosshead to move the arms along the splitting blade, splitting said partially processed pear in halves and moving the pear halves to trimming position over their respective trimming station with their calyx and seed cell portions opposite their respective trimming knife, support means mounted to support the pear halves for sliding movement between the splitting blade and the trimming stations, and means timed to operate said trimming knives with the pear halves in their trimming positions to sever the calyx and seed cell portions of said pear halves.

21. In a fruit preparation machine, a fruit splitting blade mounted for reciprocation between predetermined limits, means mounted to impale a partially processed pear along its stem blossom axis upon said splitting blade at one limit of reciprocative movement of the same, a gripper support mounted to reciprocate parallel to the plane of reciprocative movement of said splitting blade and located at a point substantially adjacent the other limit of reciprocative movement thereof, power drive means mounted to reciprocate said gripper support, a pair of gripper arms mounted upon said gripper support, pear gripping cups mounted upon said gripper arms and adapted to fit over opposite sides of said partially processed pear impaled upon said splitting blade when the latter is brought into registration therewith at said other limit of reciprocative movement of said blade, a pair of trimming stations mounted in the lateral plane of said gripper arms and in symmetrical spaced relation with respect to the plane of reciprocative movement of said splitting blade for disposition of said trimming stations upon opposite sides of said blade when the latter is brought into registration therewith at said other limit of blade reciprocative movement, a trimming knife mounted in each of said stations, a cam supporting lever pivotally mounted adjacent each gripper arm, a cam block mounted upon each of said levers and positioned in the path of a portion of the adjacent gripper arm, said cam block being shaped to separate said gripper arms on a movement of the gripper support in one direction to position said pear gripping cups over opposite sides of said partially processed pear impaled upon said splitting blade, said cam block being further shaped, on a reciprocative movement of the gripper arms in the opposite direction, to move said pear across said splitting blade to split said pear in halves and to move the pear halves onto their respective trimming stations, each of said cam blocks being adapted to swing the lever on which it is mounted out of the path of said cam engaging gripper arm portion on a movement of the gripper arms in the latter direction, and timed drive means mounted to operate said trimming knives with the pear halves positioned on their respective trimming stations.

22. In a fruit preparation machine, a support member mounted for reciprocation between predetermined limits, a splitting blade mounted upon said support member for reciprocative movement therewith, means mounted to impale a partially processed pear along its stem axis upon said splitting blade at one limit of reciprocative movement of the same, a pair of pear supporting plates mounted in fixed spaced relation and adapted to receive said support member at the other limit of reciprocative movement of said blade, with the pear supporting surfaces of said plates in registration with said splitting blade and extending therefrom in prolongation to the sides thereof, a calyx and seed cell severing station mounted in each of said pear supporting plates, a rotary trimming knife having calyx and seed cell severing portions thereon rotatively mounted in each of said stations, means mounted to grip said partially processed pear impaled upon said splitting blade and to move said pear thereover, splitting said pear in halves and moving said halves onto said pear supporting surfaces to position the calyx and seed cell portions of said halves over their respective calyx and seed cell severing stations, and periodically operated drive means mounted rotatively to move each of said trimming knives to circumscribe and sever said calyx and seed cell portions of said pear halves when so positioned.

23. In a fruit preparation machine, a pear splitting and transferring blade mounted for reciprocation between predetermined limits, means mounted to impale a pear along its stem blossom axis on said splitting blade at one limit of its reciprocative movement, a pair of spaced pear supporting plates mounted to receive said splitting blade therebetween at its other limit of reciprocative movement and to extend in divergent relation from the sides of said blade, a calyx and seed celling station mounted in each of said pear supporting plates, a knife rotatively mounted within each of said stations and having a calyx and seed cell severing portion formed thereon, means for gripping the transferred pear impaled upon said splitting blade and drawing it toward and over said pear supporting plates, thereby splitting said pear in halves, means for positioning said halves over their respective calyx and seed cell severing stations, and periodically actuated knife operating means mounted to swing the calyx and seed cell severing knives to circumscribe and sever the calyx and seed cell portions of said pear halves so positioned.

24. In a fruit preparation machine, a frame, a splitting blade supporting member mounted upon said frame for reciprocation between predetermined limits, a pear splitting and transferring blade mounted upon said supporting member for reciprocative movement therewith, said blade having a sharpened edge, drive means mounted to reciprocate said supporting member and splitting blade in a lengthwise direction, means mounted to impale a pear along its stem blossom axis upon the sharpened edge of said splitting blade in one limit of reciprocative movement of said blade, a pair of spaced pear supporting plates mounted to receive said blade supporting member therebetween in the other limit of reciprocative movement of said splitting blade, said blade supporting member and said splitting blade having portions thereof adapted, when said blade supporting member is interposed between said plates, to overlie the adjacent edges of said pear supporting plates and to extend substantially in prolongation thereto, means mounted to grip the transferred pear impaled upon said splitting blade and to force it thereover, splitting said pear in halves, and moving said halves to predetermined positions on said pear supporting plates, a calyx and seed cell severing station mounted in said predetermined position in each of said pear supporting plates, a rotary trimming knife mounted in each of said stations, and lost motion drive means operatively interconnected between said reciprocating splitting blade supporting member and said trimming knives to effect rotation of the latter upon a predetermined reciprocative movement of said blade supporting member.

References Cited in the file of this patent

UNITED STATES PATENTS

| Number | Name | Date |
|---|---|---|
| 1,430,628 | Coons | Oct. 3, 1922 |
| 1,584,398 | Pease | May 11, 1926 |
| 1,956,492 | China | Apr. 24, 1934 |
| 2,007,558 | Bem | July 9, 1935 |
| 2,139,704 | Thompson | Dec. 13, 1938 |
| 2,161,806 | Ewald | June 13, 1939 |
| 2,179,529 | Thompson | Nov. 14, 1939 |
| 2,187,063 | Thompson | Jan. 16, 1940 |
| 2,187,075 | Coons | Jan. 16, 1940 |
| 2,257,341 | Jepson | Sept. 30, 1941 |
| 2,429,749 | Dunn | Oct. 28, 1947 |
| 2,431,310 | Coons | Nov. 25, 1947 |
| 2,446,640 | Dunn | Aug. 24, 1948 |
| 2,526,712 | Thompson | Oct. 24, 1950 |